US012289539B1

(12) United States Patent
Garcia et al.

(10) Patent No.: US 12,289,539 B1
(45) Date of Patent: Apr. 29, 2025

(54) DEVICE FOR DETERMINING PINCH POINT(S) ALONG CONVEYOR(S)

(71) Applicant: Amazon Technologies, Inc., Seattle, WA (US)

(72) Inventors: Gines Garcia Garcia, Castelldefels (ES); Victor Celemin Peinado, Manises (ES); Anibal Jose Gutierrez de Uriarte Calvo, Cartagena (ES)

(73) Assignee: Amazon Technologies, Inc., Seattle, WA (US)

( * ) Notice: Subject to any disclaimer, the term of this patent is extended or adjusted under 35 U.S.C. 154(b) by 222 days.

(21) Appl. No.: 18/129,318

(22) Filed: Mar. 31, 2023

(51) Int. Cl.
*H04N 23/90* (2023.01)
*H04N 7/18* (2006.01)
*H04N 23/56* (2023.01)
*H04N 23/57* (2023.01)

(52) U.S. Cl.
CPC ............ *H04N 23/90* (2023.01); *H04N 7/188* (2013.01); *H04N 23/56* (2023.01); *H04N 23/57* (2023.01)

(58) Field of Classification Search
CPC ........ H04N 23/56; H04N 23/57; H04N 23/90; H04N 7/188
See application file for complete search history.

(56) References Cited

U.S. PATENT DOCUMENTS

| 6,435,331 | B1* | 8/2002 | Olson | B65G 47/681 |
| | | | | 198/357 |
| 8,886,356 | B2* | 11/2014 | Magato | B65G 43/00 |
| | | | | 700/230 |
| 9,089,059 | B1* | 7/2015 | Haskin | G06F 1/1626 |
| 2010/0155194 | A1* | 6/2010 | Schafer | B25G 43/08 |
| | | | | 198/357 |
| 2021/0023706 | A1* | 1/2021 | Sorin | B25J 15/04 |

\* cited by examiner

*Primary Examiner* — Marly S Camargo
(74) *Attorney, Agent, or Firm* — Eversheds Sutherland (US) LLP

(57) ABSTRACT

A device includes a battery, a container, a frame, a first imaging device disposed at least partially within the container and coupled to the frame, a second imaging device disposed at least partially within the container and coupled to the frame, and a third imaging device disposed at least partially within the container and coupled to the frame. The first imaging device is oriented in a first direction, the second imaging device is oriented in a second direction that is different than the first direction, and the third imaging device is oriented in the second direction.

20 Claims, 22 Drawing Sheets

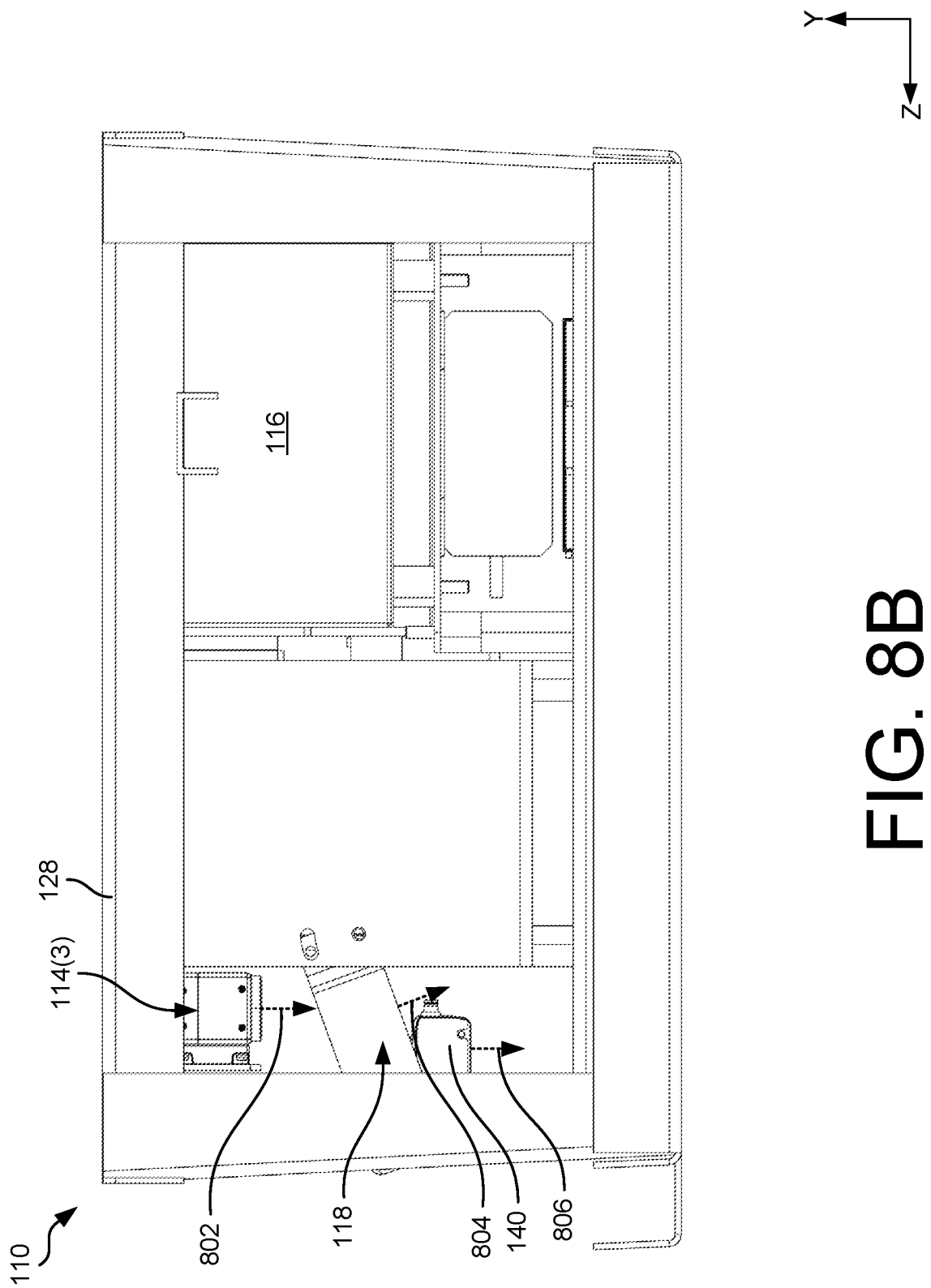

DEVICE FOR DETERMINING PINCH POINT(S) ALONG CONVEYOR(S)

BACKGROUND

Modern environments, such as warehouses, distribution centers, airports, and manufacturing facilities, include conveyors that may be used to transport items. In some examples, the conveyors may be disposed end-to-end to transfer the items between conveyors, such as from a first conveyor to a second conveyor. Along the conveyors, or at an intersection of conveyors, pinch points may pose a risk to personnel operating within the environment. For example, as personnel remove items from or place items onto the conveyors, their fingers may become pinched. Accordingly, there exists a need conveniently and efficiently check for pinch points between conveyors, for example, to reduce injury.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIGS. 8A-8D illustrate side views of the assembly and the frame of the device of FIG. 2, according to an example of the present disclosure.

DETAILED DESCRIPTION

Figure 1:
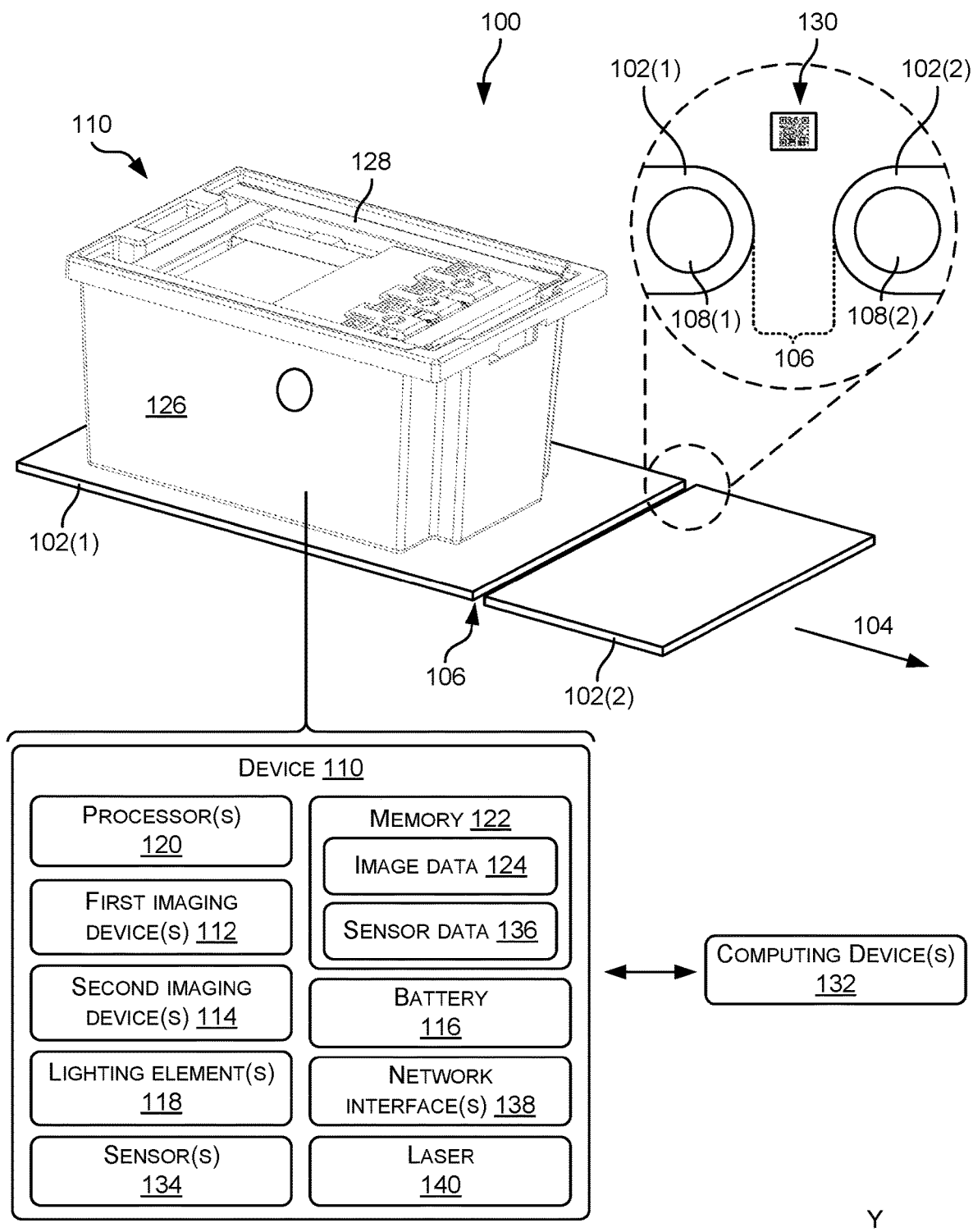
FIG. 1 illustrates an example device used within an environment to determine pinch points, according to an example of the present disclosure.

This application is directed, at least in part, to a device that may be used to determine pinch points between conveyors within an environment. In some instances, the device may include a container that houses a battery, one or more imaging device(s), and/or one or more lighting element(s). The container may include a first opening through which a first imaging device is arranged to image a marker disposed between a first conveyor and a second conveyor. The container may also include a second opening through which one or more second imaging device(s) are arranged to image an intersection between the first conveyor and the second conveyor. The lighting element(s) are arranged to output light in a direction towards the second opening such that the intersection is illuminated when imaged by the second imaging device(s). Image data generated by the second imaging device(s) may be analyzed, either by the device or other computing device(s), to determine whether the intersection includes a gap that is greater than a threshold distance. For example, if the gap is greater than the threshold distance, the intersection may be determined as a pinch point (e.g., where fingers may get caught). Accordingly, the device may be used to determine an existence of pinch points within the environment to reduce injuries and/or increase a throughput of item(s) along the conveyor(s).

The container may represent any suitable container, such as a bin, tote, etc. The container may include a cavity or interior within which the components of the device reside. For example, the battery, the first imaging device, and the second imaging device(s) may reside within the interior of the container. In some instances, the container may include a top that is open, such that the components may be placed within the interior. In addition, the container may include at least the first opening and the second opening. The first opening may be disposed on a side of the container, while the second opening may be disposed on a bottom of the container, opposite the top of the container. The bottom of the container resides on the conveyor(s) as the device traverses along the conveyor(s) within the environment. In addition, the container may include a third opening disposed on the bottom, and through which a laser (or other sensor) is used to detect the intersection. For example, the laser may detect a distance to the conveyor, and if the distance is greater than a threshold, an intersection may be approaching. In response, the second imaging device(s) may be instructed to power on in order to capture image data of the intersection.

The first imaging device is disposed within the container and oriented towards the first opening. In some instances, the first image device is configured to image a marker disposed at an intersection between two conveyors. For example, the intersections between conveyors within the environment may be marked such that the intersections are identifiable among one another. That is, the environment may include any number of intersections, and the markers may be imaged to identify the intersections amongst one another. The markers may be installed, for example, during a commissioning of the conveyors. In some instances, the markers may be disposed at each intersection, or a subset of the intersections. The markers may represent any suitable identifier capable of being imaged by the first imaging device (e.g., indication, picture, QR code, barcode, etc.). As will be discussed herein, the first imaging device may capture an image of the marker for identifying an intersection between two or more conveyors. For example, as the second imaging device(s) generate image data, that image data may be associated with image data generated by the first imaging device in order to associate the image data with one another.

The second imaging device(s) are disposed within the container and oriented towards the second opening. The second imaging device(s) are configured to image the intersection between two conveyors, via the second opening. In some instances, the second imaging device(s) are spaced apart from one another, across a width of the container, such that the second imaging device(s) are able to image the intersection at different locations across the width of the conveyor. For example, in some instances, the second imaging device(s) may include three imaging devices that are spaced apart from one another across the width of the container. A first of the second imaging device(s) may image the intersection at a first location (e.g., a first side/end), a second of the second imaging device(s) may image the intersection at a second location (e.g., middle), and a third of the second imaging device(s) may image the intersection at a third location (e.g., a second side/end). The intersection may therefore be imaged at different locations to determine whether the intersection contains a pinch point.

In some instances, the second opening includes a single opening through which the second imaging device(s) are configured to image the intersection. Alternatively, in some instances, the container may include multiple openings, such as a second opening through which the first of the second imaging devices is configured to image the intersection, a third opening through which the second of the second imaging devices is configured to image the intersection, and/or a fourth opening through which the third of the second imaging devices is configured to image the intersection. In other words, separate openings may be disposed through the container, and individual imaging devices of the second imaging device(s) may be oriented towards one of the separate openings.

The lighting element(s) may include light emitting diodes (LEDs) that are configured to illuminate the intersection. In some instances, any number of the lighting element(s) may be disposed within the container for illuminating the intersection. For example, the device may include separate lighting elements, a lighting element bar (e.g., light bar), and so forth. The lighting element(s) are oriented towards the second opening of the container such that the intersection is illuminated when imaged by the second imaging device(s). In some instances, the lighting element(s) may continuously emit light onto the conveyor(s), or may output light in response to the detection of an intersection (e.g., upon the first imaging device(s) imaging the marker.

As the second imaging device(s) generate image data of the intersection, in some instances, the image data is stored on memory of the device (e.g., SD card). The image data generated by the first imaging device may also be stored on the memory for associating with the image data generated by the second imaging device(s). For example, associating the image data as generated by the first imaging device with the image data generated by the second imaging device(s) permits the intersections to be distinguishable from one another within the environment. In doing so, the image data generated by the second imaging device(s) is associated with a particular intersection within the environment, as determined by the image data generated by the first imaging device, for determining whether the intersection contains a pinch point.

In some instances, the image data generated by the second imaging device(s) is analyzed to determine the presence of an intersection (e.g., void or gap between conveyors). For example, the second imaging device(s) may continuously generate the image data as the device traverses the environment. Thereafter, the image data may be analyzed to identify the intersections and whether the intersections contain or represent pinch points. Here, the second imaging device(s) may continuously capture images and then the image data may be analyzed to determine where the intersection is within the image data. In other instances, the first imaging device(s) identify the marker, and in response, the device may cause the second imaging device(s) to generate the image data of the intersection. Here, the device may know when the intersection is approaching or is underneath the device, and accordingly, capture image data of the intersection. Regardless, in upon determining the presence of the intersection, the image data (or the intersection) may be analyzed to determine a distance disposed between adjacent conveyors (e.g., a spacing therebetween).

In some instances, given that the device may include three of the second imaging device(s), the image data generated by each of the second imaging device(s) may be analyzed to determine the distance disposed between the conveyors, along a length of the intersection (or across a width of the conveyor). Upon determining the distance of the intersection, the distance may be compared against the threshold distance to determine potential pinch points. That is, if the distance disposed between the conveyors is greater than the threshold distance, a pinch point may be determined to exist at the intersection.

In some instances, the threshold distance may be five (5) millimeters (mm), however, the threshold distance may be different than described and/or may be modified depending on specifics of the environment, the conveyor(s), tolerances, etc. If the intersection contains distance(s) that are greater than the threshold distance, the conveyor (or rather, a specific intersection) may be determined to have a pinch point. Conversely, if the intersection contains distance(s) that are less than the threshold distance, the conveyor may not be determined to have a pinch points (e.g., the conveyor may be void of pinch points). In some instances, if any portion of the intersection has a distance that is greater than the threshold distance, the conveyor may have a pinch point. That is, if the first location of the intersection that is imaged by the first of the second imaging devices has a distance of four (4) mm, the second location of the intersection that is imaged by the second of the second imaging devices has a distance of four (4) mm, but the third location of the intersection that is imaged by the third of the second imaging devices has a distance of six (6) mm, the conveyor may have a pinch point at the intersection. Here, because the image data generated by the third of the second imaging devices indicates that the intersection has a distance that is greater than the threshold distance, the pinch point may be determined. Further, the image data as generated by the first imaging device is used to identify the intersection among other intersections within the environment for pinpointing the location of the intersection.

During use, the device may be placed on the conveyor and traverse about the environment. For example, the conveyors may propel the device throughout the environment, and during which, the second imaging device(s) may image intersections between the conveyors. Throughout the environment, as the device moves along the conveyors, the device may be configured to image any number of intersections. Moreover, as the device moves about the environment, the image data captured by the first imaging device is associated with the image data captured by the second imaging device(s) (e.g., using time stamps). This allows for the association of identified intersections with certain locations within the environment. Moreover, as noted above, the image data as generated by the first imaging device and the second imaging device(s) may be stored on the memory. After the device traverses about the environment, for example, the image data of the first imaging device and the second imaging device(s) may be downloaded, uploaded, or otherwise transferred to other computing device(s). In some instances, the image data is stored on a removable hard drive. After the device traverses the environment, the removable hard drive may be removed from the device and connected to other computing device(s). The one or more computing devices, for example, separate from the device, may analyze the image data to determine the presence or absence of pinch points.

Comparatively, in some instances, the device may itself determine the presence of pinch points. In some instances, the device may determine, in real time and as the device traverses about the environment, the presence or pinch points. Alternatively, in some instances, the device may communicatively connect to the one or more computing device(s) for uploading (e.g., transferring) the image data. That is, the device may continuously send, as the device traverses about the environment, the image data to the computing device(s) for analysis.

In some instances, the device includes the laser that is oriented towards the third opening. The third opening may be disposed in front of the second opening, relative to the direction of travel of the device. The laser, as briefly introduced above, may be configured to identify an upcoming intersection for use in causing the second imaging device(s) to power on or to capture image data of the intersection. In other words, the laser may be used to determine the presence of an upcoming intersection, and in response, the second imaging device(s) may capture image data of the intersection. More particularly, as the laser generates sensor data, the sensor data is analyzed to determine whether the distance between the laser and a surface (e.g., a top of the conveyor) is greater than a threshold. If the distance is less than the threshold, this may indicate that the laser did not detect the intersection. However, as the device approaches or traverses over the intersection, the distance measured by the laser may be greater than the threshold. That is, when the distance increases, this may indicate that the laser detected an intersection. Accordingly, based on the detection of the intersection, the second imaging device(s) may be powered on, or otherwise caused, to capture the image data of the intersection for use in determining whether the intersection contains a pinch point. In some instances, the second imaging device(s) may be powered on for a certain period of time (e.g., 5 ms, 1 second, etc.) after identification of the intersection to capture the image data, and thereafter, may be powered off to conserve the battery (until a subsequent intersection is identified). In some instances, the identification of the intersection, via the laser, may be used to power on the lighting element(s) and/or cause the first imaging device(s) to capture image data of the marker. Controlling the first imaging device(s), the second imaging device(s), and/or the lighting element(s) in this manner may save battery power of the battery of the device.

Moreover, because the laser may be used to detect the intersection, the laser may be located in front of the second imaging device(s), relative to the direction of travel of the device.

In some instances, the image data is used to generate a report that identifies the intersections as well as the distances disposed between the intersections. In some instances, the report may include indications as to those intersections that are pinch points (e.g., distances greater than the threshold distance) as well as those intersections that are not pinch points (e.g., distances less than the threshold distance). The results may be color coordinated or otherwise distinguishable from one another to determine those intersections that have pinch points and those intersections that do not have pinch points. Using the report, for example, personnel may fix or perform maintenance on the conveyors to reduce a distance disposed across the intersection and potentially eliminate pinch points. As such, the device may be used as a convenient way to identify intersections that pose concerns for injury.

In some instances, the components of the device are coupled to a frame disposed within the container. The components may be coupled to the frame for orienting the components appropriately. For example, the second imaging device(s) may be coupled to the frame for orienting the second imaging device(s) towards the second opening and for imaging the intersection. Additionally, within the container, the components are communicatively connected to one another. For example, the battery may be connected to the first imaging device, second imaging device(s), etc.

Although the device is described as identifying pinch points at intersections between two conveyors, the device may be used to identify pinch points at intersections between a conveyor and ball transfers, between a conveyor and chutes, between a conveyor and a turntable, or more generally, between a conveyor and a transfer location (e.g., station, pallet, table, stationary platform, etc.). The intersection may be between two moving mediums (e.g., between two moving conveyors), between two non-moving mediums (e.g., platform to platform), and/or between a moving medium (e.g., conveyor) and a non-moving medium (e.g., platform). Moreover, in some instances, the device may be configured to identify pinch points on different types of conveyors, such as belt conveyors, slate conveyors, and so forth. Additionally, or alternatively, the device may be configured to identify pinch points on roller-type conveyors. The pinch points as described herein may be along straight sections, curves, different elevations, and so forth. In such instances, the second imaging device(s), for example, may image a gap between adjacent rollers to determine whether the gap is a pinch point (e.g., gap is greater than the threshold distance). However, although the pinch points are described herein as corresponding to intersections along a system of conveyors, in some instances, a pinch point may be any point at which it is possible for a person or part of a person's body to be caught between moving parts of a machine, or between the moving and stationary parts of a machine, or between material and any part of the machine. For example, a pinch point may be caused by crushing and shearing hazards, snagging or entanglement hazards, drowing-in hazards (e.g., nip points and friction points), and/or impact hazards.

Additionally, although the markers are described as being disposed adjacent to intersections between conveyors the markers may also be used to identify locations of other areas of concern along the conveyor(s). For example, in line with the above, the markers may be placed next to entanglement hazards where projecting sharp edges, teeth, wedges, screws, lubricating nipples, shafts, or the like move so that persons, parts of their bodies or their clothing can be caught and carried along. These, and other hazards, may be marked and imaged during operation of the device. In doing so, the device may be used to identify locations along the conveyors (or other machines) that may cause harm to personnel.

The device may include additional or alternative components other than those described. For example, the device may include network interface(s) (e.g., Bluetooth, Wi-Fi, etc.) for communicatively connecting with computing device(s) (e.g., to upload the image data). Additionally, in some instances, the device may include thermal imaging device(s) to identify friction points on the conveyors (e.g., belts rubbing, etc.). The device may also include vibration sensor(s) (e.g., accelerometer) for identifying vibration within the conveyor(s). Similar to the pinch points, the friction points or vibration points may be identified for use in reducing injury and/or prolonging the life of the conveyor(s).

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example environment 100 that includes one or more conveyor(s) 102 for transporting item(s), according to an example of the present disclosure. In some instances, the environment 100 may correspond to an environment in which item(s) are packed and readied for shipment. For example, the environment 100 may include an inventory of item(s) and the item(s) may be packaged for shipment. However, although described as an environment in which item(s) are packaged for shipment, the environment 100 may be representative of other environments (e.g., airport, cross-docking station, etc.).

The environment 100 includes the one or more conveyor(s) 102 for transporting the item(s) between locations within the environment 100. The environment 100 may include any number of the conveyor(s) 102, and/or different types of conveyor(s) (e.g., roller, belt, etc.). As shown in FIG. 1, the environment 100 includes at least a first conveyor 102(1) and a second conveyor 102(2). In some instances, the first conveyor 102(1) transfers item(s) to the second conveyor 102(2) (e.g., based on a direction of travel 104). In some instances, the first conveyor 102(1) and the second conveyor 102(2) may be disposed along a straight (e.g., linear) section, a turn, a change in elevation, and so forth.

An intersection 106 is formed, or exists, between the first conveyor 102(1) and the second conveyor 102(2). The intersection 106 may represent a gap (e.g., spacing) between the first conveyor 102(1) and the second conveyor 102(2) in which the item(s) are transferred from the first conveyor 102(1) to the second conveyor 102(2). Within the environment 100, intersections may be formed between the conveyors 102, respectively. That is, although FIG. 1 illustrates the intersection 106 between the first conveyor 102(1) and the second conveyor 102(2), an intersection may be formed between the second conveyor 102(2) and a third conveyor (downstream of the second conveyor 102(2)), an intersection may be formed between the third conveyor and a four conveyor, and so forth. The first conveyor 102(1) and the second conveyor 102(1) may be powered via one or more pulleys, respectively, such as a first pulley 108(1) and a second pulley 108(2), to move the item(s) in the direction of travel 104.

A device 110 may be placed onto the conveyors 102 to determine pinch points within the environment 100. For example, a pinch point may be any point at which it is possible for a person or part of a person's body to be caught between moving parts of a machine, or between the moving and stationary parts of a machine. As it relates to the environment 100, the pinch point may exist at the intersection 106 between the first conveyor 102(1) and the second conveyor 102(2), and the device 110 may traverse throughout the environment 100, along the conveyors 102, to determine the pinch points. More particularly, and as will be explained herein, a pinch point may exist when an intersection between the conveyors, such as the intersection 106 between the first conveyor 102(1) and the second conveyor 102(2) is greater than a threshold distance. In such instances, the intersection 106 may pose a risk to drowing-in a portion of a body (e.g., finger).

In some instances, the device 110 may include first imaging device(s) 112, second imaging device(s) 114, one or more batteries 116, and lighting element(s) 118. Additionally, the device 110 is shown including processor(s) 120 and memory 122, where the processor(s) 120 perform various functions and operations associated imaging the environment 100, such as the intersections 106, and the memory 122 may store instructions executable by the processor(s) 120 to perform the operations described herein. For example, as the device 110 moves about the environment 100, the processor(s) 120 may cause the first imaging device(s) 112 and the second imaging device(s) 114 to generate image data 124 of the intersections 106. As the image data 124 is generated, the image data 124 may be stored within the memory 122.

The device 110 may include a container 126 (e.g., bin, tote, etc.) within which components of the device 110 reside. For example, the first imaging device(s) 112, the second imaging device(s) 114, the one or more batteries 116, the lighting element(s) 118, and so forth may reside within the container 126. In some instances, the device 110 includes a frame 128 disposed within the container 126, and the components of the device 110 may couple to the frame 128. The frame 128 may provide structural rigidity to the device 110, and the container 126 may at least partially enclose components of the device 110. The container 126 and/or the frame 128 may be made of any suitable material (e.g., plastic, composite, metal, etc.).

The first imaging device(s) 112 are configured to image a marker 130 (e.g., indication, barcode, QR code, etc.) disposed adjacent to the intersection 106. In some instances, the first imaging device(s) 112 are arranged towards a side of the container 126 (or a side of the device 110). As the device 110 traverses about the environment 100, the first imaging device(s) 112 image the marker 130 for identifying the intersections among one another. The container 126 may include an opening through which the first imaging device(s) 112 are arranged to image the marker 130. In some instances, the markers 130 are disposed on a certain side of the conveyors 102 for imaging by the first imaging device(s) 112. In some instances, the marker 130 is disposed at the intersection 106, prior to the intersection 106, and/or after the intersection 106. As the device 110 traverses about the environment 100, the first imaging device(s) 112 are configured to generate the image data 124 depicting, representing, or corresponding to the markers 130. The markers 130 may be used to identify the intersections 106 (or potential pinch points) amongst one another throughout the environment 100. In some instances, the first imaging device(s) 112 couple to the frame 128 for orienting the first imaging device(s) 112 towards the opening in the container 126.

The second imaging device(s) 114 are disposed within the container 126 and are configured to image the intersection 106. The container 126 may include one or more opening(s) through which the second imaging device(s) 114 are configured to image the intersection 106. The one or more opening(s) through which the second imaging device(s) 114 are arranged to image the intersection 106 may be located on a bottom of the container 126. In some instances, the device 110 includes more than one of the second imaging device(s) 114 to image the intersection 106. For example, the second imaging device(s) 114 may include multiple imaging devices that are spaced apart from one another across a width of the container 126 (e.g., in the X-direction). In doing so, the second imaging device(s) 114 are able to image the intersection 106 at different locations.

For example, in some instances, the second imaging device(s) 114 may include three imaging devices that are spaced apart from one another across the width of the container 126. A first of the second imaging device(s) 114 may image the intersection 106 at a first location (e.g., a first side/end), a second of the second imaging device(s) 114 may image the intersection 106 at a second location (e.g., middle), and a third of the second imaging device(s) 114 may image the intersection at a third location (e.g., a second side/end). Each of the second imaging device(s) 114 generates the image data 124 depicting the intersection 106 (at different locations), and the image data 124 may be used to determine whether the intersection 106 contains pinch points. Although described as including three of the second imaging device(s) 114, more than or less than three of the second imaging device(s) 114 may be included.

As the second imaging device(s) 114 image the intersection 106, the image data 124 of the second imaging device(s) 114 may be associated with the image data 124 of the first imaging device(s) 112. For example, associating the image data 124 generated by the first imaging device(s) 112 with the image data 124 generated by the second imaging device(s) 114 permits the intersections 106 to be distinguishable from one another within the environment 100. The image data 124 generated by the second imaging device(s) 114 is associated with a particular intersection within the environment 100, as determined by the image data 124 generated by the first imaging device(s) 112, for determining whether the intersection 106 contains a pinch point.

In some instances, the image data 124 as generated by the second imaging device(s) 114 is continuously generated as the device 110 traverses the environment 100. Thereafter, the image data 124 may be analyzed to identify the intersections 106 and whether the intersections 106 contain or represent pinch points. In other instances, the first imaging device(s) 112 identify the marker 130, and in response, the device 110 may cause the second imaging device(s) 114 to generate the image data 124 of the intersection 106. In some instances, following a completion of traversing the environment 100, the image data 124 may be sent to one or more computing device(s) 132. For example, in some instances, the image data 124 may be sent (e.g., via wired connections or wireless connections) to the computing device(s) 132. Alternatively, in some instances, the image data 124 may be stored on a removable hard drive and after the device 110 traverses the environment 100, the removable hard drive may be removed from the device 110 and provided to the computing device(s) 132.

The computing device(s) 132 may analyze the image data 124 to determine the presence of the intersection 106 and whether the intersection 106 contains a pinch point. In some instances, given that the device 110 may include three of the second imaging device(s) 114, the image data 124 generated by each of the second imaging device(s) 114 may be analyzed to determine the distance disposed between the conveyors 102, along a length of the intersection 106. Upon determining the distance of the intersection 106, that is, the distance between the first conveyor 102(1) and the second conveyor 102(2), across the intersection 106, the distance may be compared against a threshold distance to determine potential pinch points. If the distance disposed between the conveyors 102 is greater than the threshold distance, a pinch point may be determined to exist at the intersection 106. The computing device(s) 132 may include suitable components (e.g., processor(s), memory, image analysis, controllers, etc.) to identify the intersections 106, compare the distances of the intersection 106 with the threshold distances, determine the pinch points, and so forth.

In some instances, the threshold distance may be five (5) millimeters (mm), however, the threshold distance may be different than described and/or may be modified depending on specifics of the environment 100, the conveyor(s) 102, tolerances, etc. If the intersection 106 contains distance(s) that are greater than the threshold distance, the conveyor 102 (or rather, a specific intersection) may be determined to have a pinch point. Conversely, if the intersection 106 contains distance(s) that are less than the threshold distance, the conveyor 102 may not be determined to have a pinch point (e.g., the conveyor 102 may be void of pinch points). In some instances, however, given that the image data 124 of the intersection 106 may be generated by different second imaging device(s) 114, if any portion of the intersection 106 has a distance that is greater than the threshold distance, the conveyor 102 may have a pinch point.

For example, if the first location of the intersection 106 that is imaged by the first of the second imaging device(s) 114 has a distance of four (4) mm, the second location of the intersection 106 that is imaged by the second of the second imaging device(s) 114 has a distance of four (4) mm, but the third location of the intersection 106 that is imaged by the third of the second imaging device(s) 114 has a distance of six (6) mm, the conveyor 102 may have a pinch point. Stated alternatively, if the distance is greater than the threshold distance, the intersection 106 may be associated with or have a pinch point. That is, because the image data 124 generated by the third of the second imaging device(s) 114 indicates that the intersection 106 has a distance that is greater than the threshold distance, a pinch point may be determined. Further, the image data 124 as generated by the first imaging device(s) 112 is used to identify the intersection 106 among other intersections 106 within the environment 100 for pinpointing the location of the intersection 106.

In some instances, the computing device(s) 132 may generate a report that identifies the intersections 106 as well as the distances disposed between the intersections 106. In some instances, the report may include indications as to those intersections 106 that are pinch points (e.g., distances greater than the threshold distance) as well as those intersections 106 that are not pinch points (e.g., distances less than the threshold distance). The results may be color coordinated or otherwise distinguishable to determine those intersections 106 that have pinch points and those intersections 106 that do not have pinch points. Using the report, for example, personnel may fix or perform maintenance on the conveyors 102 to reduce a distance disposed across the intersection 106 and potentially eliminate or reduce the pinch points.

Although the discussion herein is with regard to the computing device(s) 132 determining the pinch points, in some instances, the device 110 may itself determine the presence of pinch points. For example, the device 110 may determine, in real time and as the device 110 traverses about the environment 100, the presence or pinch points. Alternatively, in some instances, the device 110 may analyze the image data 124 after traversing about the environment 100. In some instances, the device 110 may communicatively connect to the computing device(s) 132 for uploading (e.g., transferring) the image data 124 as the device 110 traverses about the environment 100 or after the device 110 traverses about the environment 100.

In some instances, the first imaging device(s) 112 may have a focal length of 8 mm, and/or the second imaging device(s) 114 may have a focal length of 16 mm. In some instances, the first imaging device(s) 112 has a lower resolution than the second imaging device(s) 114. In some instances, the first imaging device(s) 112 and/or the second imaging device(s) 114 include red, green, blue, depth (RGBD) camera(s) and/or three-dimensional (3D) sensors.

In some instances, the device 110 may include sensor(s) 134, such as thermal imaging device(s), vibration sensor(s) (e.g., accelerometer), infrared (IR) receiver(s), humidity sensor(s), temperature sensor(s), gyroscopes, and/or other types of sensor(s). The sensor(s) 134 may generate sensor data 136 that is used to determine other points of concerns associated with the conveyor(s) 102. For example, in addition to the pinch points, the conveyor(s) 102 may include other points of concern (e.g., vibration, friction, misalignment, etc.). As an example, thermal imaging device(s) may generate the sensor data 136 that indicates temperatures along the conveyor(s) 102. The temperature(s) may be used to determine whether there are friction points, rubbing points, etc. along the conveyor(s) 102, such as between the first pulley 108(1) and the first conveyor 102(1) (e.g., a belt thereof). Using the sensor data 136, the conveyor(s) 102 may be serviced (e.g., tightened, loosened, realigned, etc.). As an additional example, vibrational sensors may generate sensor data 136 that indicates areas of the conveyor(s) 102 that include vibrations. As a results, bearings of the conveyor(s) 102 may be replaced or serviced. Although certain sensor(s) 134 and sensor data 136 is described, the sensor(s) 134 may include sensor(s) 134 other than those described and which are used to generate sensor data 136. The device 110 may be configured to send, and the computing device(s) 132 are configured to receive, the sensor data 136 generated via the sensor(s) 134.

The device 110 may also include a laser 140 that generates sensor data 136 indicative of the intersection 106. The laser 140 may measure a distance to the conveyor 102 (e.g., a top surface thereof). If the distance is less than a threshold, the device 110 may not be approaching or be at the intersection 106. However, if the distance is equal to or greater than a threshold, the intersection 106 may be approaching. In response, the second imaging device(s) 114 may be instructed to power on in order to capture the image data 124 of the intersection 106. In some instances, sensing the intersection 106 via the laser 140 may also be used to power on the lighting element(s) 118. As such, the laser 140 may generate the sensor data 136 for determining whether the intersection 106 is approaching, and if so, the second imaging device(s) 114 may be instructed to power on and capture the image data 124. The laser 140 may be located in front of the second imaging device(s) 114, relative to the direction of travel 104. In some instances, the second imaging device(s) 114 may be powered on for a certain period of time (e.g., 5 ms, 1 second, etc.) to capture the image data 124, and thereafter, may be powered off to conserve the battery 116. However, upon the laser 140 being used to identify another intersection 106, the second imaging device(s) 114 may be powered on once again. In some instances, the identification of the intersection 106 may additionally or alternatively be used to cause the first imaging device(s) 112 to capture the image data 124 of the marker 130.

In some instances, the device 110 may include network interface(s) 138 that are used to communicatively connect with one or more computing device(s) 132. The network interface(s) 138 may communicative over a network with the computing device(s) 132. The network may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The device 110 and the computing device(s) include suitable components, interfaces, and the like for communicating over the network. The computing device(s) 132 may represent any suitable computing device, such as mobile phones, laptops, televisions, and so forth.

The lighting element(s) 118 may include LEDs that are configured to illuminate the intersection 106. In some instances, any number of lighting element(s) 118 may be disposed within the container 126 for illuminating the intersection 106. The lighting element(s) 118 are oriented towards the opening(s) on the bottom of the container 126 such that the intersection 106 is illuminated when imaged by the second imaging device(s) 114. In some instances, the lighting element(s) 118 may continuously emit light onto the conveyor(s), or may output light in response to the detection of an intersection (e.g., upon the first imaging device(s) 112 imaging the marker 130. In some instances, the lighting element(s) 118 are coupled to the frame 128 disposed in the container 126. Additionally, the second imaging device(s) 114 may be coupled to the frame 128 for orienting the second imaging device(s) 114 towards the second opening and for imaging the intersection 106. Additionally, within the container 126, the components are communicatively connected to one another.

The batteries 116 may represent a suitable battery configured to power the components of the device 110 (e.g., the first imaging device(s) 112, the second imaging device(s) 114, etc.). Any number of batteries may be included, and the batteries 116 may be rechargeable and/or replaceable. Further, wires or other cables may be routed between the batteries 116 and other components of the device 110.

Although the first imaging device(s) 112 and the second imaging device(s) 114 are described as being disposed at a certain orientation, different configurations are envisioned. For example, rather than imaging the markers 130 through a side of the container 126, the first imaging device(s) 112 may be oriented upwards to additionally or alternatively image the markers 130 overhead. Additionally, instead of using an imaging device to image the markers 130, the environment 100 may include other readable mediums (e.g., RFID) for identifying the intersections.

In some instances, the computing device(s) 132 may be located within the environment 100 and/or remote from the environment 100. In some instances, the computing device(s) 132 may be implemented as one or more servers and may, in some instances, form a portion of a network-accessible computing platform implemented as a computing infrastructure of processors, storage, software, data access, etc. that is maintained and accessible via a network such as the Internet. Common expressions associated with the computing device(s) 132 include "on-demand computing", "software as a service (SaaS)", "platform computing", "network-accessible platform", "cloud services", "data centers", etc. Although the device 110 is shown having access to or storing certain data, in some instances, the computing device(s) 132 may have access to, or store, the data generated by the device 110.

As used herein, a processor, such as the processor(s) 120 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 122 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 2:
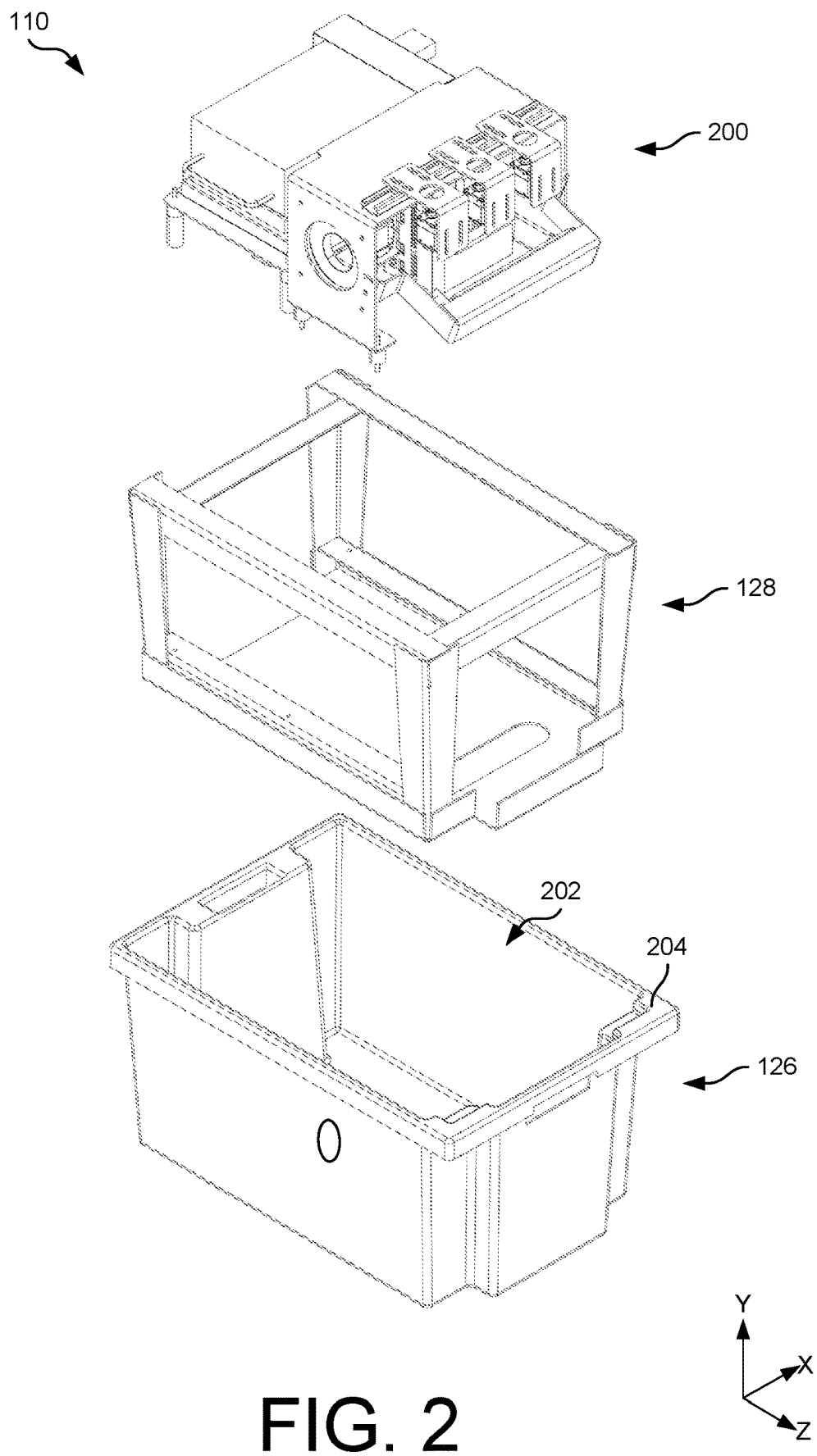
FIG. 2 illustrates an exploded view of the device of FIG. 1, showing an example assembly, an example frame, and an example container of the device, according to an example of the present disclosure.

FIG. 2 illustrates an exploded view of the device 110, according to an example of the present disclosure. In some instances, the device 110 includes the container 126, the frame 128, and an assembly 200. When assembled, the frame 128 and the assembly 200 may reside at least partially or completely within an interior cavity 202 of the container 126. As shown, the container 126 may be open at a top 204 to receive the frame 128 and the assembly 200. The assembly 200 may couple to the frame 128 for orienting components of the assembly 200, such as the first imaging device(s) 112, the second imaging device(s) 114, and so forth.

Figure 3:
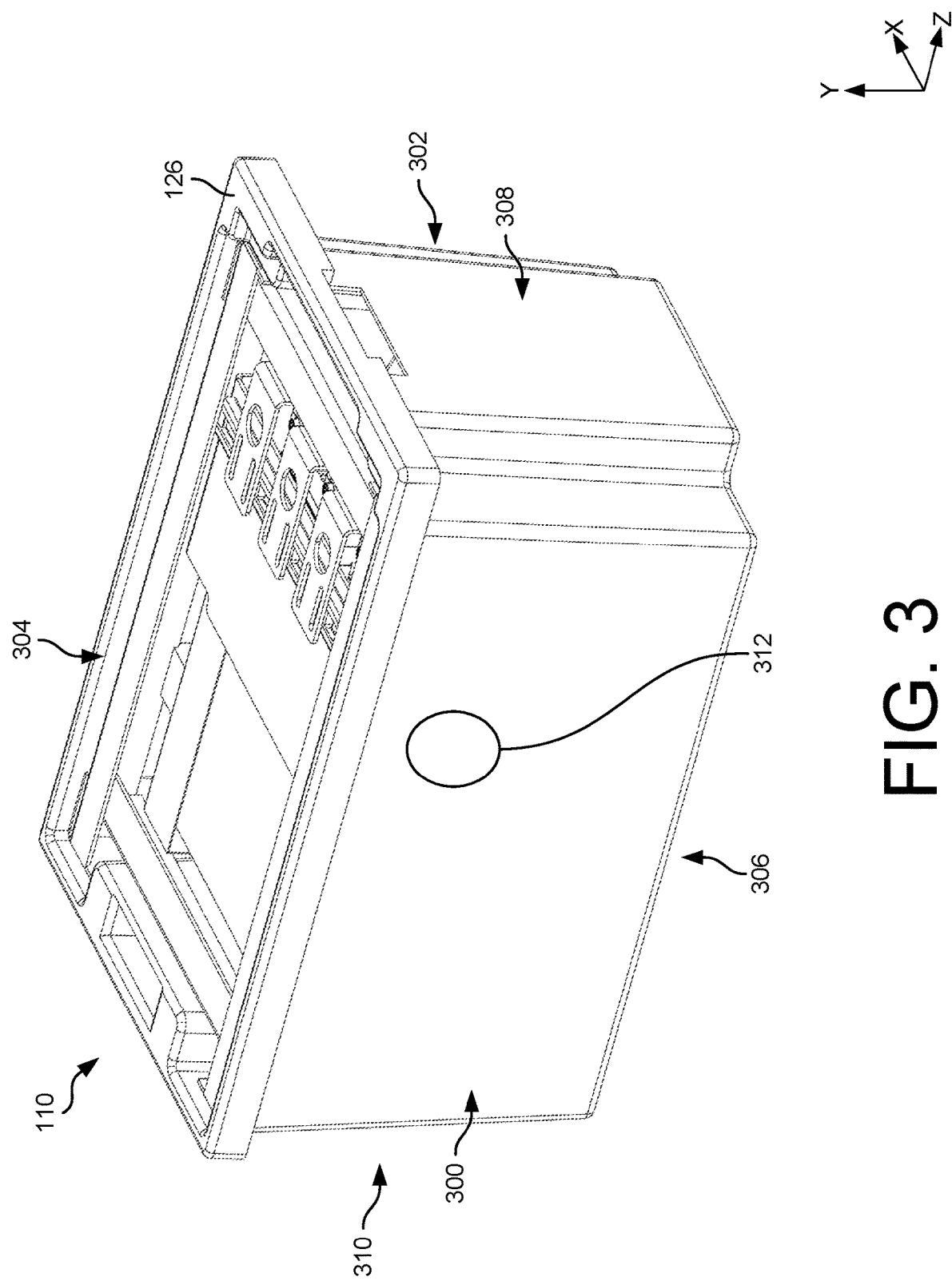
FIG. 3 illustrates a perspective view of the device of FIG. 1, according to an example of the present disclosure.

FIG. 3 illustrates a perspective view of the device of FIG. 1, according to an example of the present disclosure. In some instances, the device 110 includes a first side 300, a second side 302 spaced apart from the first side 300 (e.g., in the X-direction), a top 304 (which may correspond to the top 204), a bottom 306 spaced apart from the top 304 (e.g., in the Y-direction), a front 308, and a back 310 spaced apart from the front 308 (e.g., in the Z-direction).

The container 126 includes a first opening 312 through which the first imaging device(s) 112 are arranged to image the marker 130. For example, the first imaging device(s) 112 may be disposed behind or beneath (e.g., in the Z-direction), the first opening 312. In some instances, the first opening 312 may be circular in shape, however, other shapes are envisioned. As shown, the first opening 312 may be arranged along the first side 300 of the device 110 (or a first side of the container 126). In some instances, the first opening 312 may be located closer to the top 304 of the device 110 than the bottom 306, and/or may be located closer to the front 308 of the device 110 than the back 310.

Although the top 304 is shown being open, in some instances, the top 304 may be enclosed to prevent debris, dust, etc. entering the interior cavity 202 of the container 126. For example, the device 110 may include a lid that couples along the top 204 of the container 126.

Figure 4:
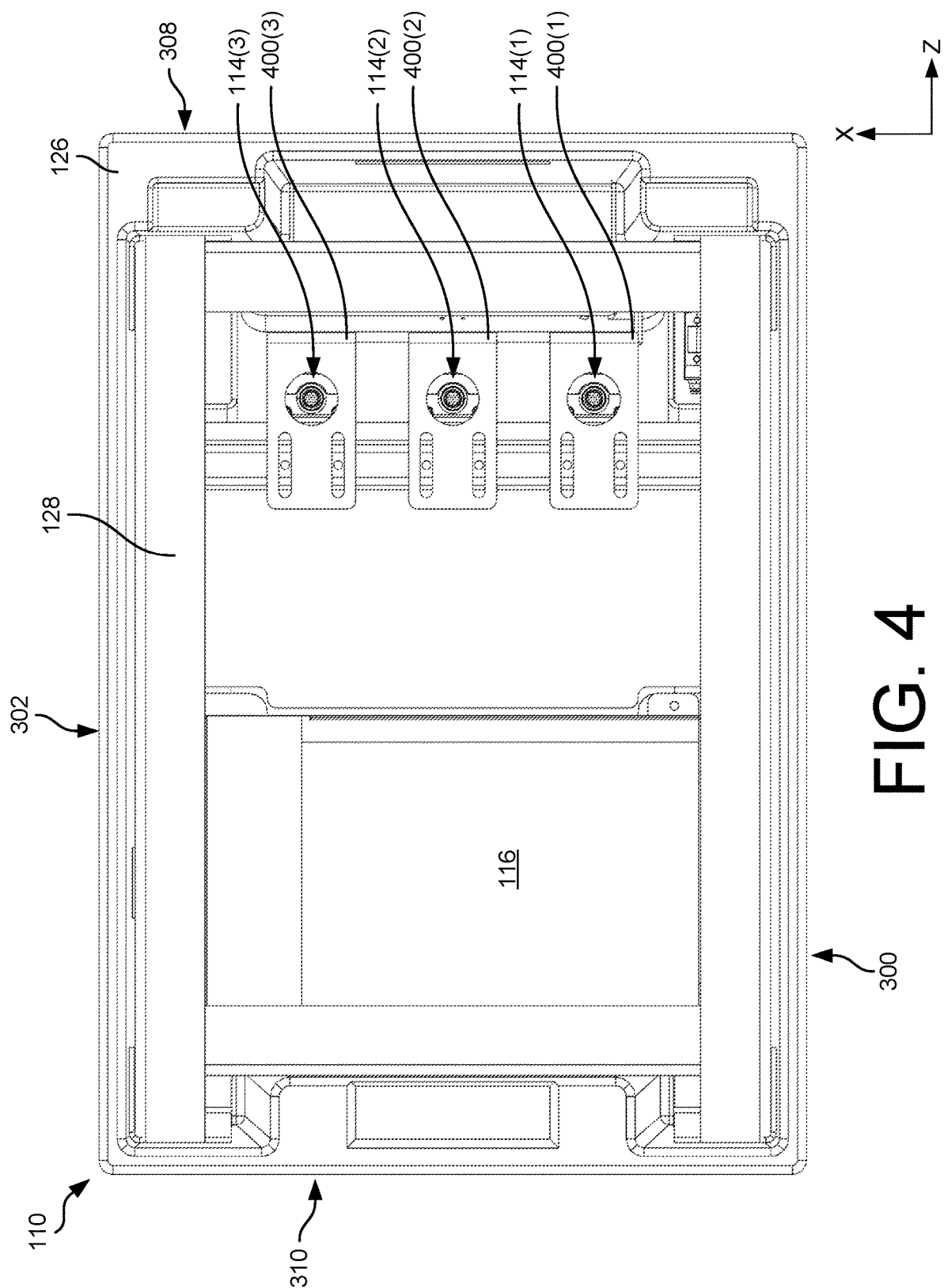
FIG. 4 illustrates a top view of the device of FIG. 1, according to an example of the present disclosure.

FIG. 4 illustrates a top view of the device 110, according to an example of the present disclosure. The device 110 includes the second imaging device(s) 114. In some instances, the device 110 includes three of the second imaging device(s) 114 arranged to image the intersection 106. In some instances, the second imaging device(s) 114 are coupled to the frame 128, or components of the assembly 200. In some instances, the second imaging device(s) 114 couple to the frame 128 or components of the assembly 200 via brackets 400.

For example, a first of the second imaging device(s) 114(1) may couple to the frame 128 or components of the assembly 200 via a first bracket 400(1). A second of the second imaging device(s) 114(2) may couple to the frame 128 or components of the assembly 200 via a second bracket 400(2). A third of the second imaging device(s) 114(3) may couple to the frame 128 or components of the assembly 200 via a third bracket 400(3). In some instances, the first of the second imaging device(s) 114(1) may be located closer to the first side 300 of the device 110 than the second of the second imaging device(s) 114(2) and the third of the second imaging device(s) 114(3). Additionally, in some instances, the third of the second imaging device(s) 114(3) may be located closer to the second side 302 of the device 110 than the first of the second imaging device(s) 114(1) and the second of the second imaging device(s) 114(2). The second of the second imaging device(s) 114(2) may be interposed between the first of the second imaging device(s) 114(1) and the third of the second imaging device(s) 114(3). Additionally, as shown, the second imaging device(s) 114 may located closer to the front 308 of the device 110 than the back 310. The second imaging device(s) 114 may also be aligned (e.g., in the X-direction).

Figure 5:
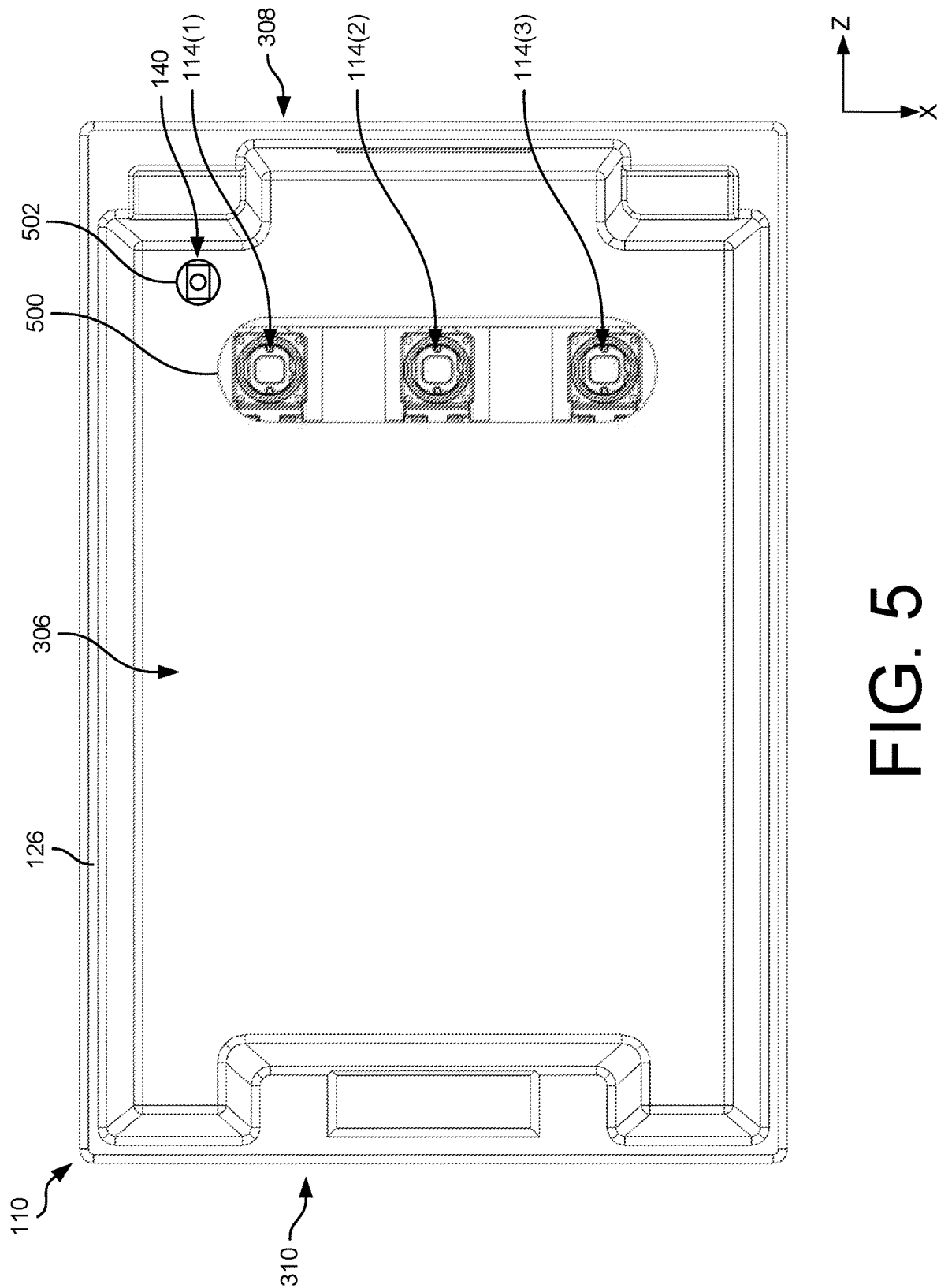
FIG. 5 illustrates a bottom view of the device of FIG. 1, according to an example of the present disclosure.

FIG. 5 illustrates a bottom view of the device 110, according to an example of the present disclosure. The container 126 includes a second opening 500 through which the second imaging device(s) 114 are arranged to image the intersection 106. As shown, the second opening 500 may be arranged on the bottom 306, and the second imaging device(s) 114 may be arranged above the bottom 306 (e.g., in the Y-direction). In some instances, the second opening 500 may be ovular in shape, however, other shaped openings are envisioned. Moreover, although a single opening is shown for the second imaging device(s) 114, the second imaging device(s) 114 may be oriented towards respective openings (e.g., three openings) on the bottom 306.

The container 126 also includes a third opening 502 through which the laser 140 is configured to identify the intersection 106. The third opening 502 may be located more proximate to the front 308 than the back 310 such that the laser 140 is able to sense the intersection 106 for causing the second imaging device(s) 114 to capture the image data 124 of the intersection 106. More particularly, as the laser 140 generates the sensor data 136, the sensor data 136 is analyzed to determine whether the distance between the laser 140 and the conveyor 102 (or other surface) is greater than a threshold. If so, the laser 140 may identify the intersection 106 (e.g., given the increased distance between the laser 140 and the sensed surface) for use in powering on the second imaging device(s) 114. By locating the laser 140 in front of the second imaging device(s) 114, the laser 140 is able to sense the intersection 106 before the second imaging device(s) 114 traverse over the intersection 106. In some instances, based on sensing the intersection 106, the first imaging device(s) 112 and/or the lighting element(s) 118 may be powered on to capture the image data 124 and output light, respectively. In some instances, the however, the first imaging device(s) 112 and/or the lighting element(s) 118 may be powered on throughout the duration of the device 110 traversing about the environment 100.

Figure 6:
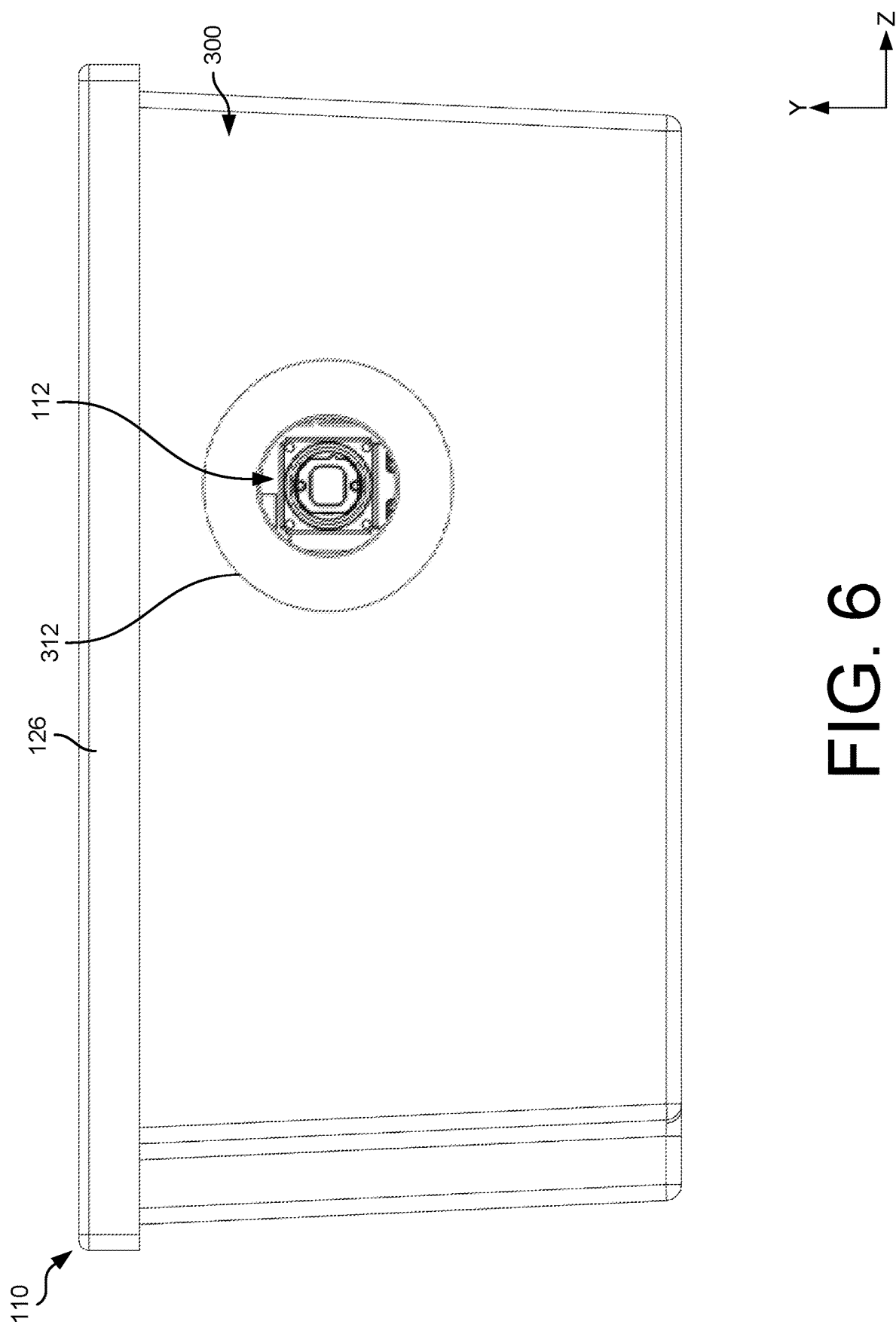
FIG. 6 illustrates a side view of the device of FIG. 1, according to an example of the present disclosure.

FIG. 6 illustrates a side view of the device 110, according to an example of the present disclosure. The view shown in FIG. 6 illustrates the first side 300. The first opening 312 is disposed through the container 126, along the first side 300, such that the first imaging device(s) 112 may image the marker 130. The first imaging device(s) 112 is disposed beneath the first opening 312.

Figure 7A:
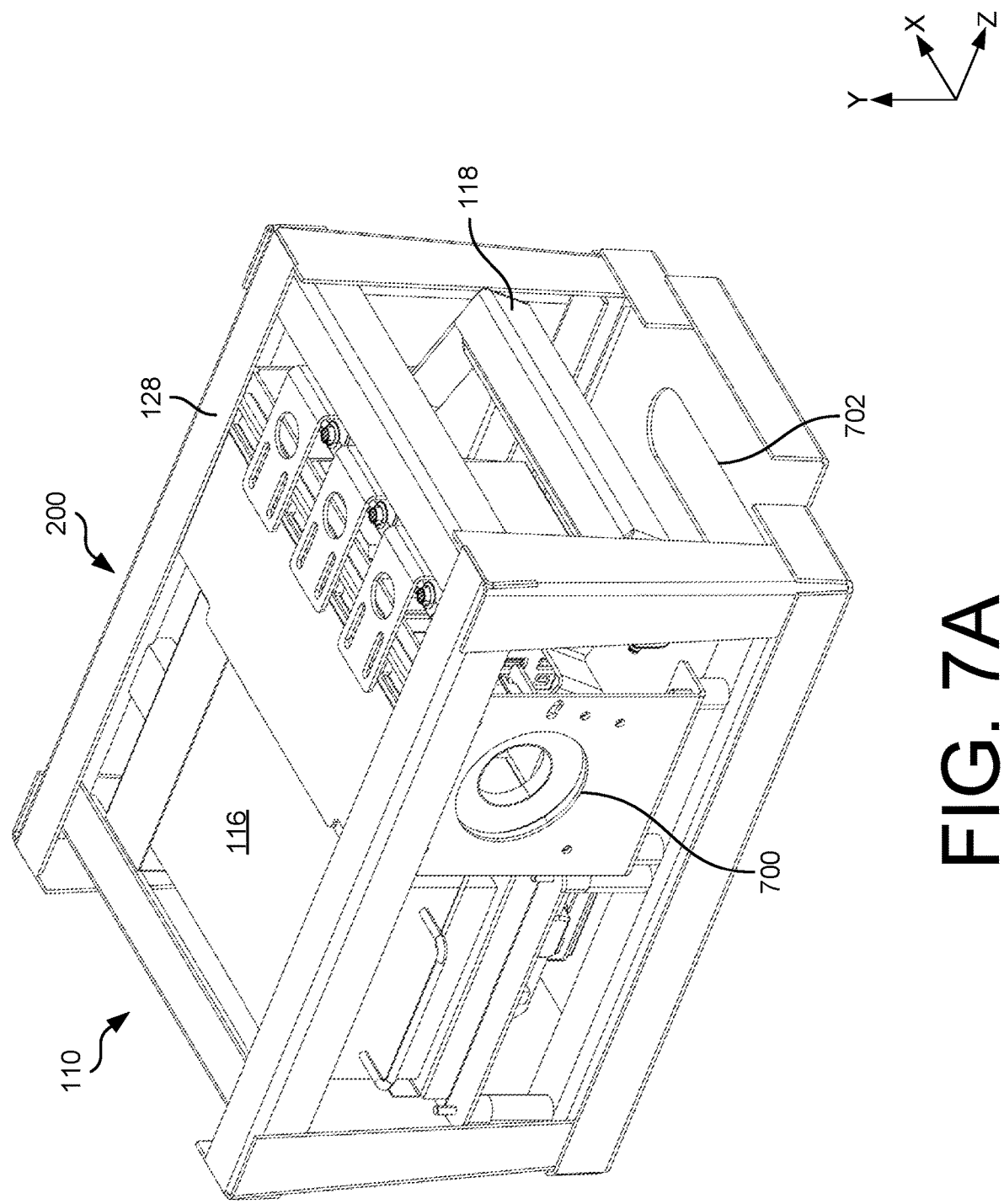
FIGS. 7A-7C illustrate perspective views of the assembly and the frame of the device of FIG. 2, according to an example of the present disclosure.
Figure 7B:
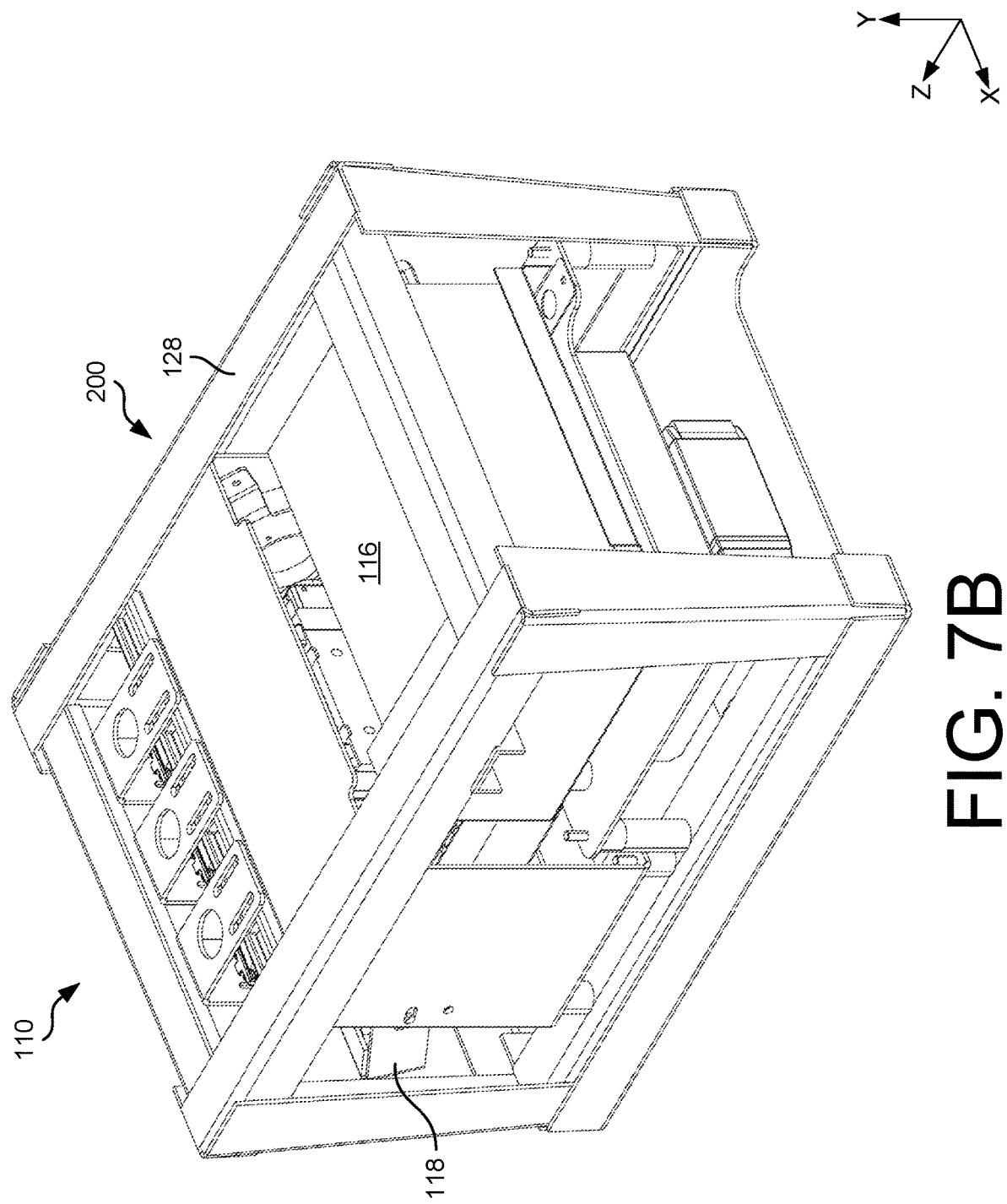
Figure 7C:
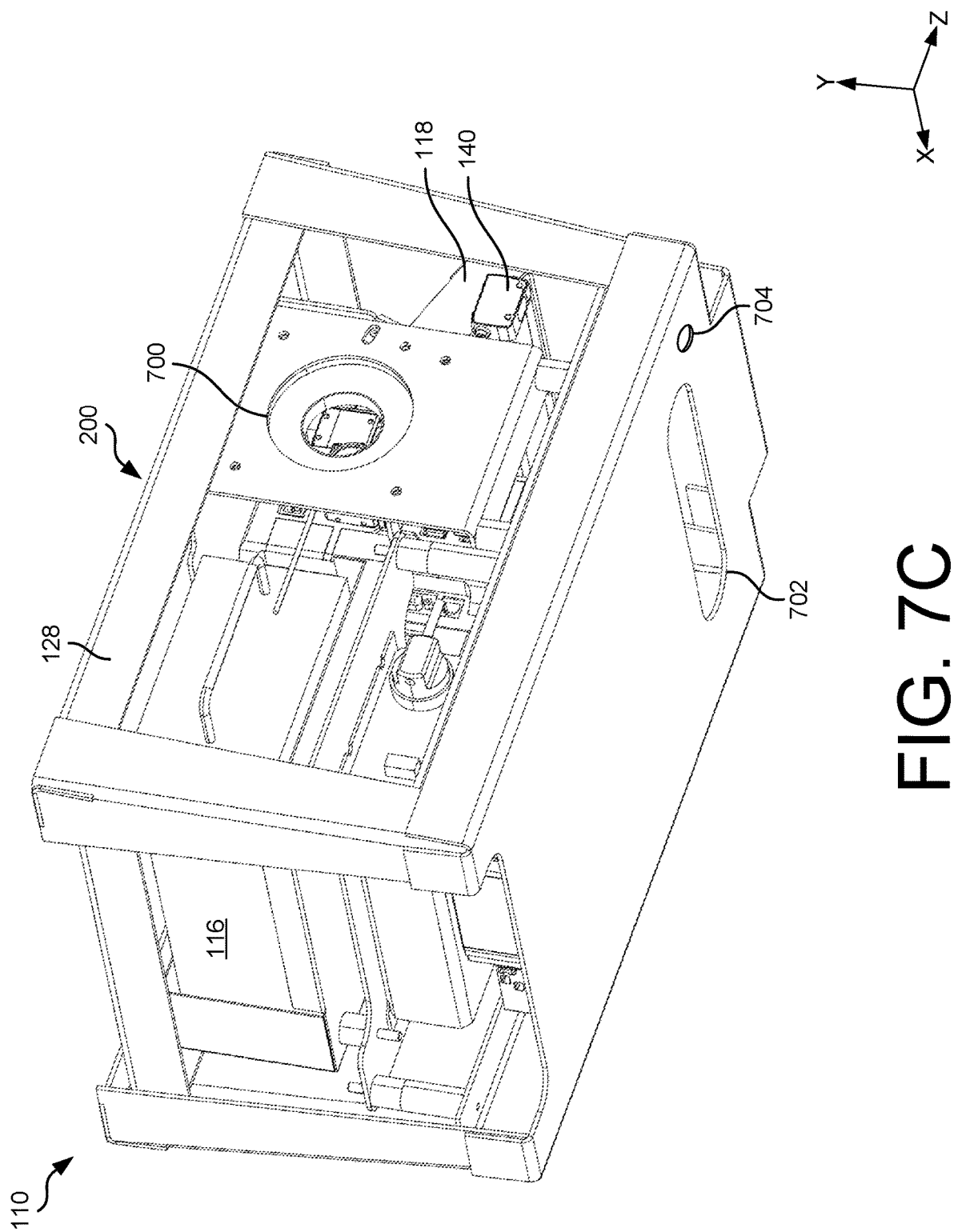
Figure 8A:
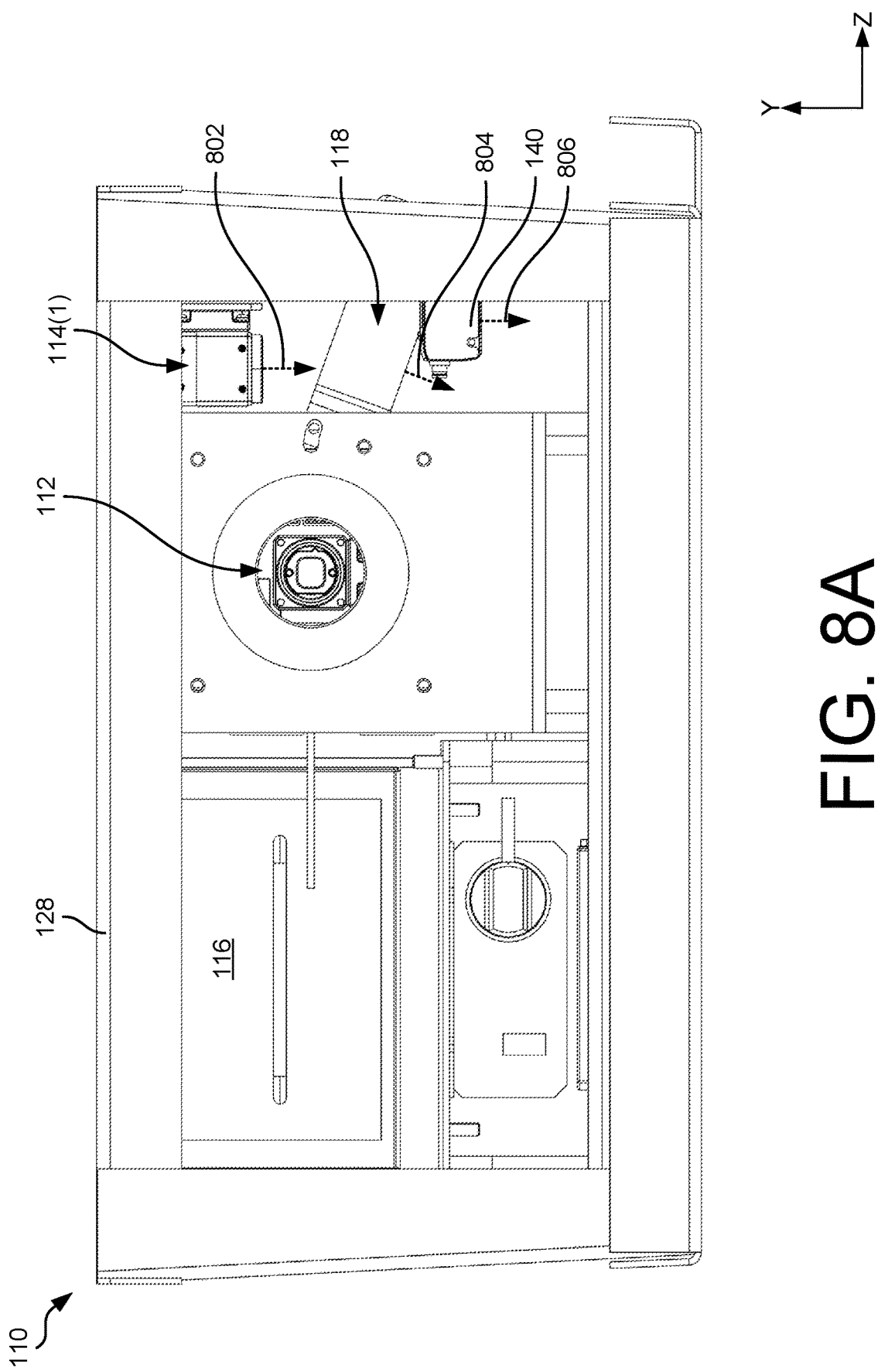
Figure 8C:
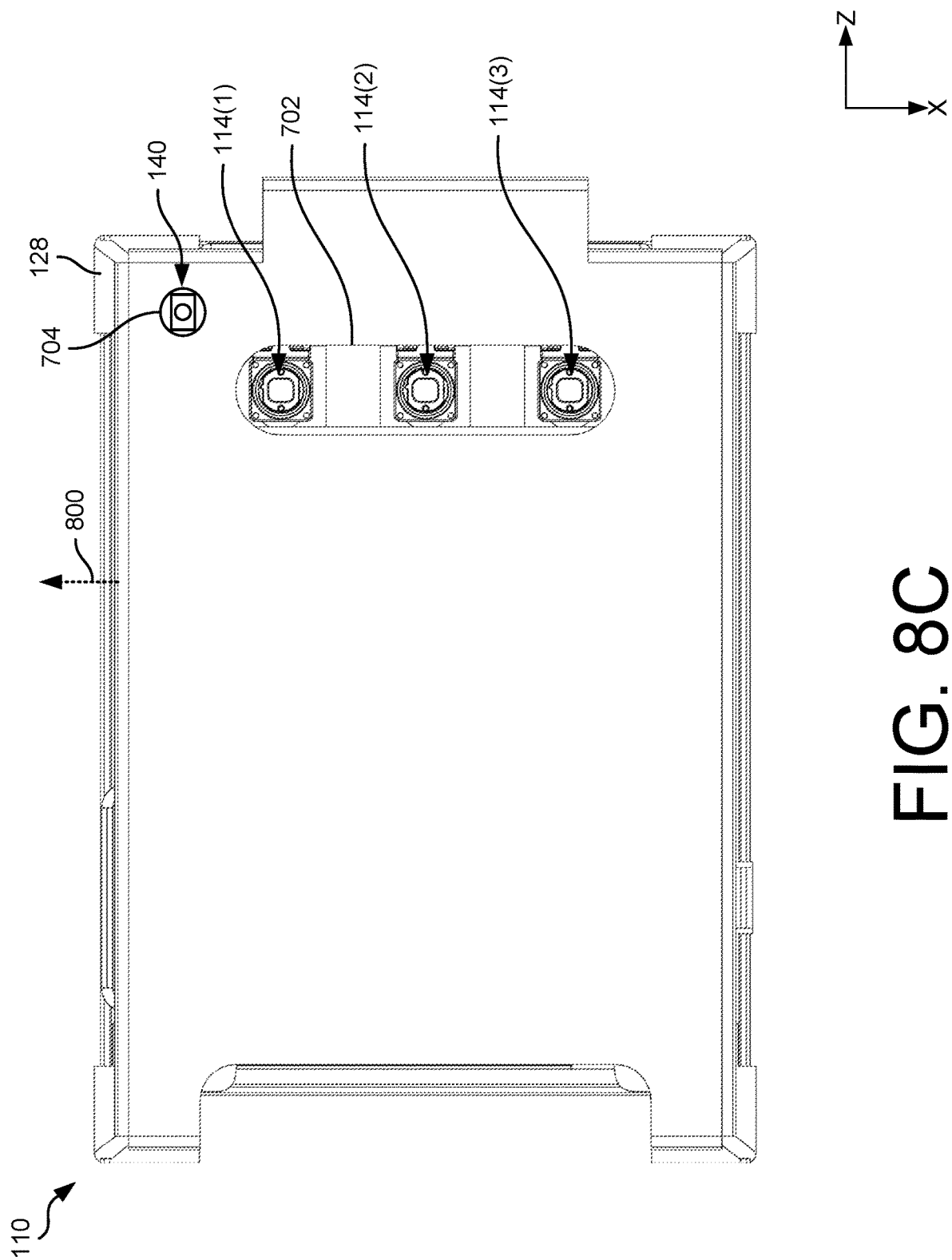
Figure 8D:
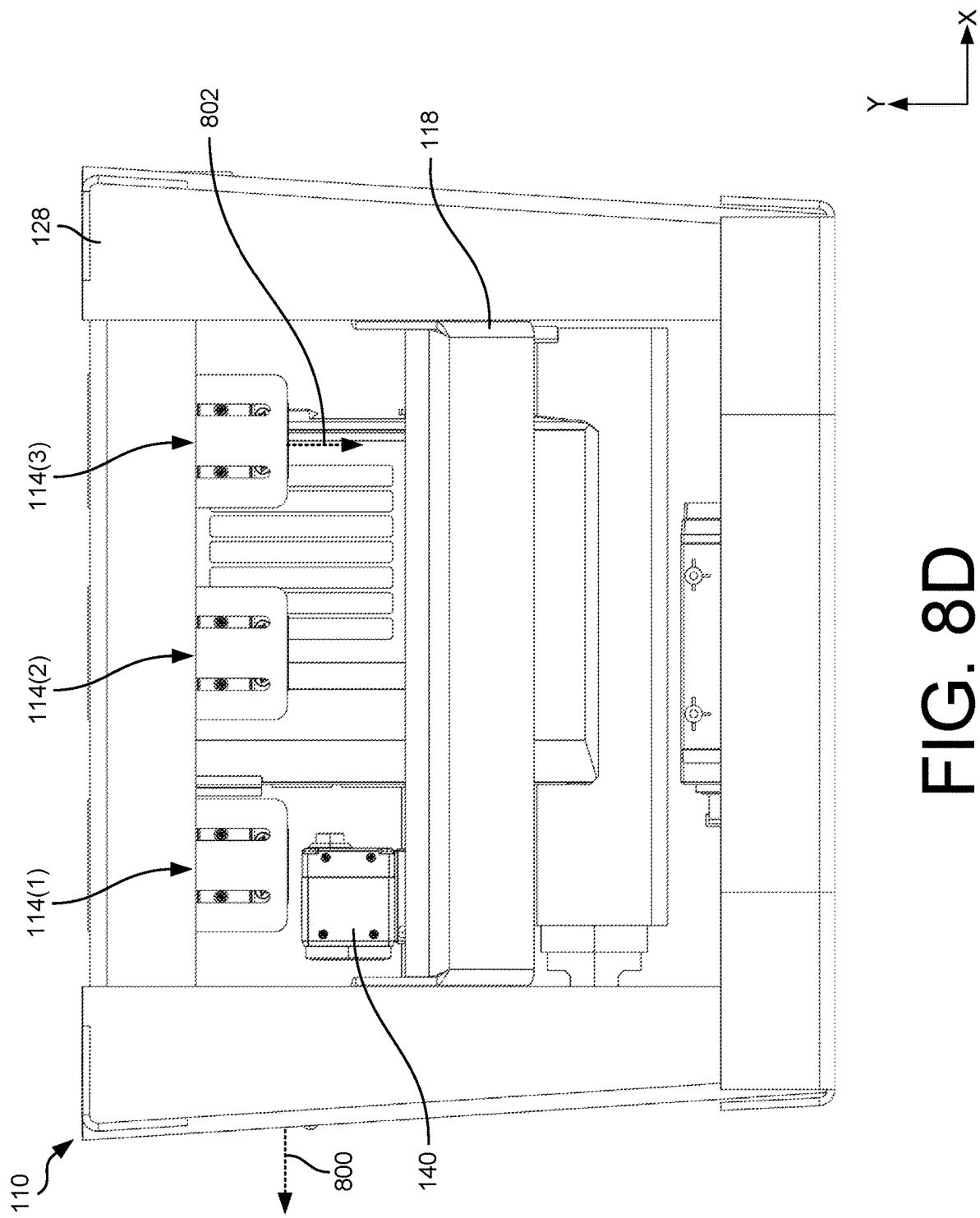

FIGS. 7A-7C illustrate various perspective views of the device 110, showing the container 126 removed, according to examples of the present disclosure. In some instances, the assembly 200 couples to the frame 128 for securing components of the assembly 200 within the device 110. In some instances, the frame 128 may be constructed from various materials (e.g., metal, composites, plastics, etc.), and may be manufactured and assembled using various techniques (e.g., stamping, bending, welding, etc.). In some instances, the frame 128 is assembled via assembling various together.

The frame 128 may include a first opening 700 through which the first imaging device(s) 112 is arranged to image the marker 130. The first opening 700 may be aligned with (e.g., concentric) the first opening 312. Additionally, the frame 128 may include a second opening 702 through which the second imaging device(s) 114 are arranged to image the intersection 106. The second opening 702 may be aligned with the second opening 500. The frame 128 also includes a third opening 704 through which the laser 140 is arranged to image the intersection 106. The third opening 704 may be aligned with the third opening 502.

Other components of the device 110, such as the lighting element(s) 118, may couple to the frame 128 and/or one another. As shown, the lighting element(s) 118 are arranged to output light in a direction towards the second opening 702 (as well as the second opening 500). Additionally, the batteries 116 may couple to the frame 128. In some instances, components of the device 110 may couple to the frame 128 via shock absorbers (e.g., springs, grommets, padding, etc.) and/or other material to reduce vibrations being imparted to the first imaging device(s) 112 and/or the second imaging device(s) 114. The components of the device 110 may also communicatively connect to one another via various cables, wires, and so forth. In some instances, the assembly 200 may be assembled, via disposing or coupling the components to the frame 128, and thereafter, the assembly 200 and the frame 128 (as a unit) may be inserted into the container 126 and coupled thereto.

FIGS. 8A-8D illustrate various views of the device 110, showing the container 126 removed, according to examples of the present disclosure. The first imaging device(s) 112 is arranged in a first direction 800 (e.g., in the X-direction) for imaging the markers 130. The second imaging device(s) 114 are arranged in a second direction 802 (e.g., in the Y-direction) for imaging the intersection 106. In some instances, each of the second imaging device(s) 114 is arranged in the second direction 802. In some instances, the second direction 802 is orthogonal to the first direction 800. The lighting element(s) 118 may be arranged in a third direction 804 that is different than the first direction 800 and/or the second direction 802. For example, the third direction 804 may be transverse to the second direction 802 (e.g., disposed at an angle relative to the second direction 802 for outputting light through the second opening 500 and the second opening 702). In some instances, the third direction 804 may be oriented at twenty, thirty, or forty degrees relative to the second direction 802. However, in some instances, the third direction 804 may be modified via a rotational coupling of the lighting element(s) 118 to the frame 128 and/or components of the device 110. The laser 140 may be arranged in a fourth direction 806 that is different than the first direction 800 and/or the third direction 804. In some instances, the fourth direction 806 is the same as the second direction 802.

Figure 9A:
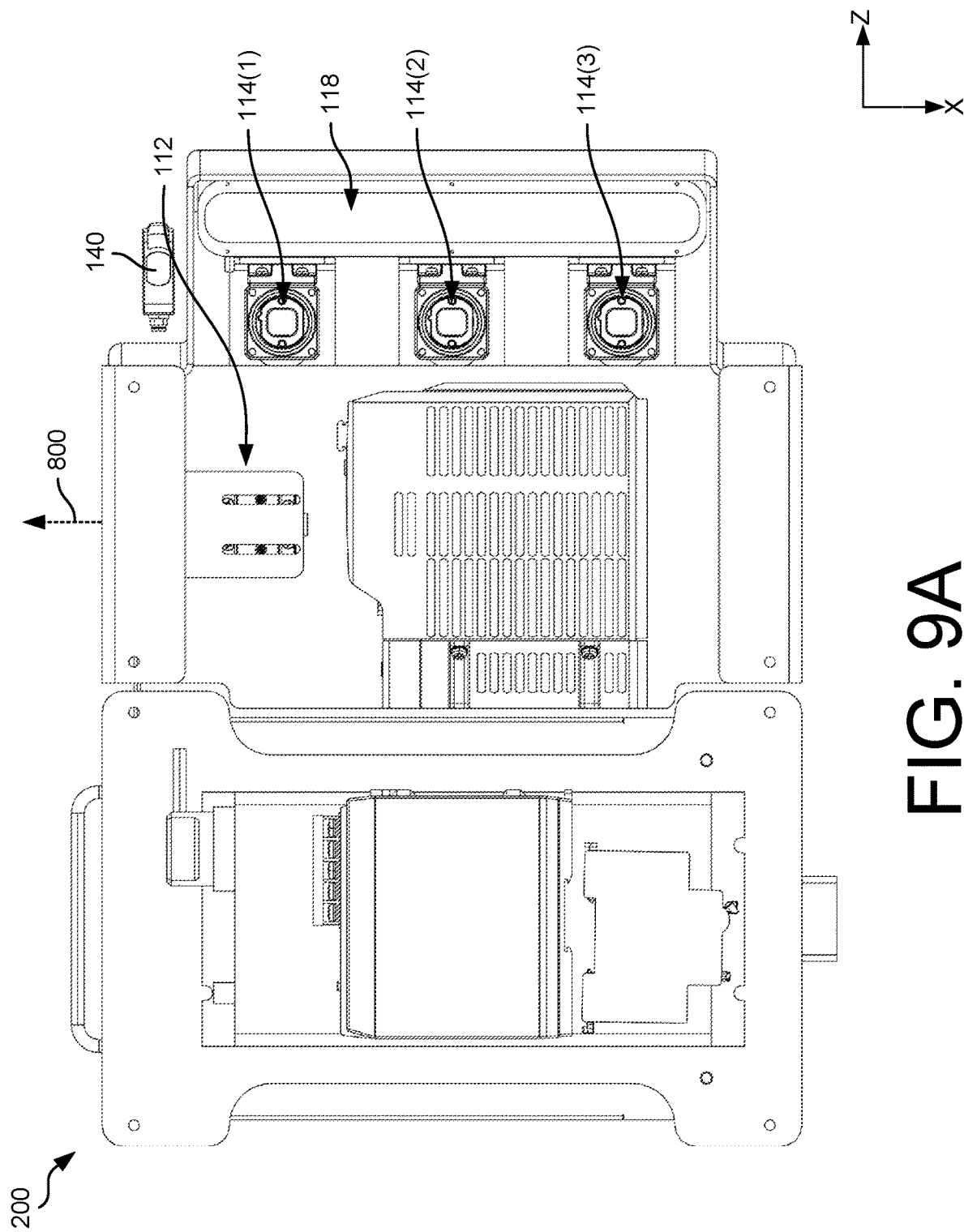
FIGS. 9A and 9B illustrate side views of the assembly of the device of FIG. 2, according to an example of the present disclosure.
Figure 9B:
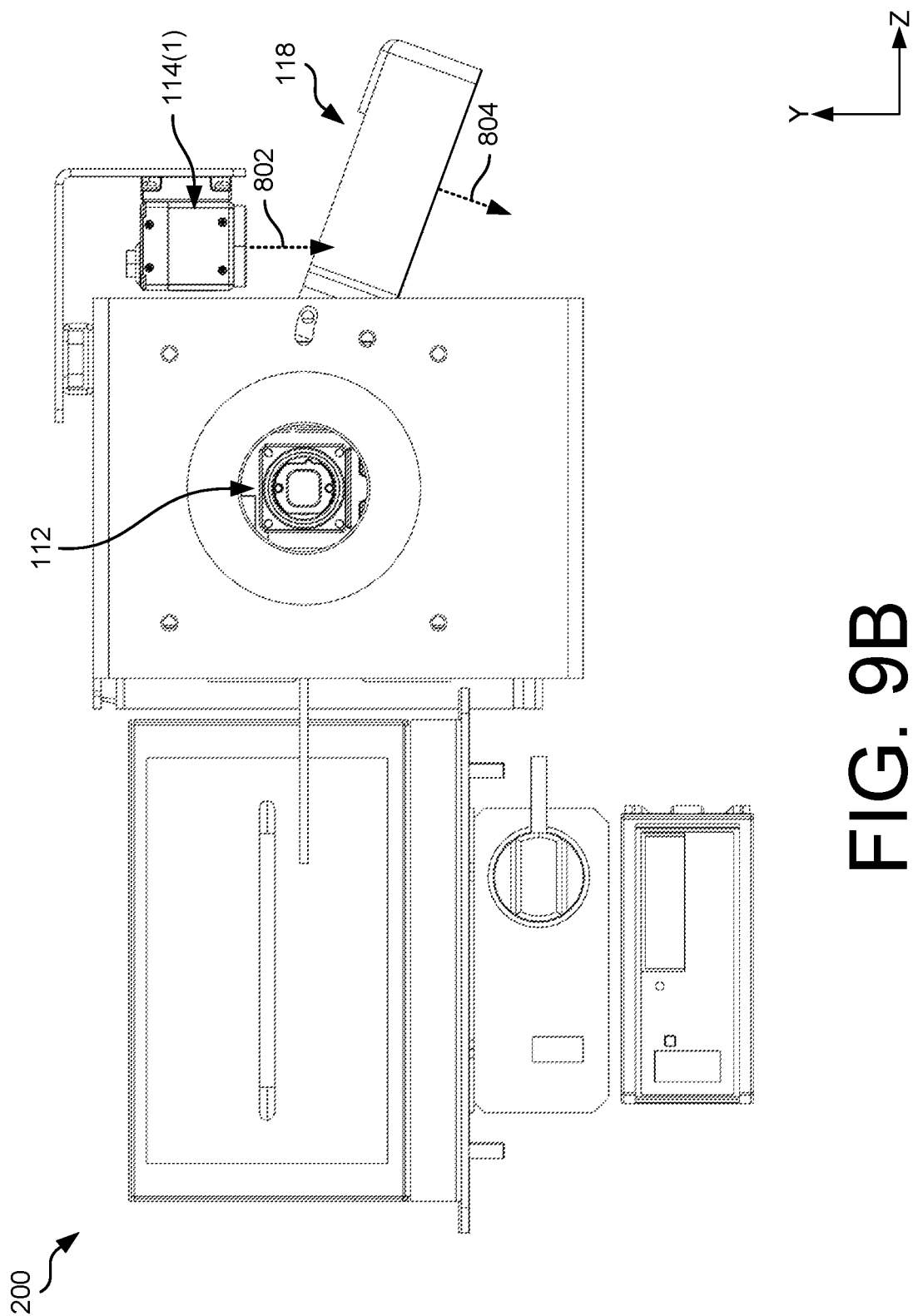

FIGS. 9A and 9B illustrate components of the device 110, for example, of the assembly 200, according to examples of the present disclosure. In FIGS. 9A-9C, the container 126 and the frame 128 are shown removed. The first imaging device(s) 112 is arranged in the first direction 800, and the second imaging device(s) 114 are arranged in the second direction 802. Additionally, the lighting element(s) 118 are arranged in the third direction 804.

Figure 10:
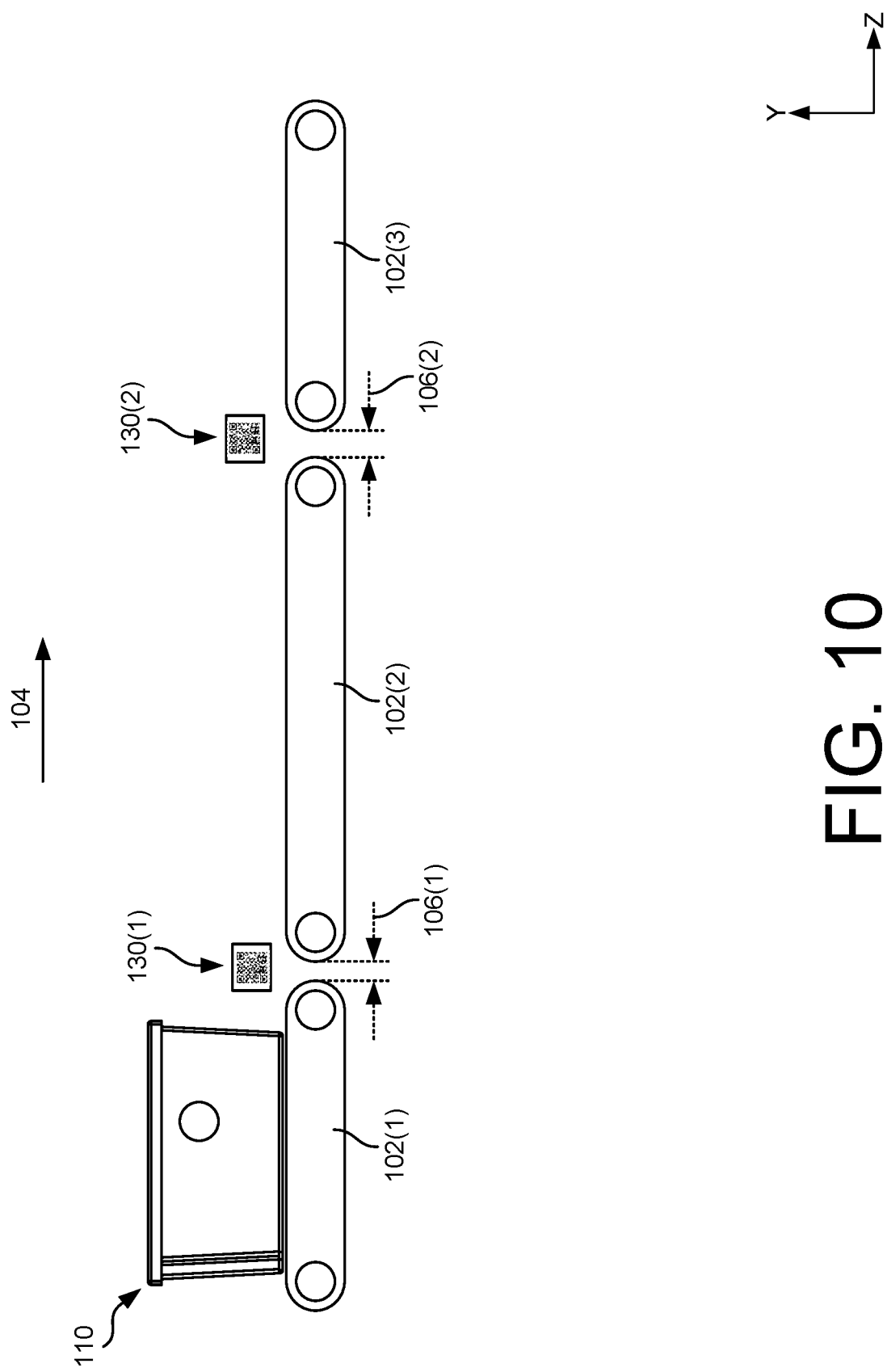
FIG. 10 illustrates an example use of the device of FIG. 1, according to an example of the present disclosure.

FIG. 10 illustrates an example use of the device 110, according to an example of the present disclosure. As the device 110 traverses along the conveyors 102, the device 110 captures images of the markers 130 and the intersections 106. For example, the first imaging device(s) 112 are arranged to image the markers 130, and the second imaging device(s) 114 are arranged to image the intersections. As shown in FIG. 10, as the device 110 moves in the direction of travel 104, the device 110 images a first intersection 106(1) between a first conveyor 102(1) and a second conveyor 102(s), as well as a second intersection 106(2) between the second conveyor 102(2) and the third conveyor 102(3). In addition, the device 110 images a first marker 130(1) associated with the first intersection 106(1), and a second marker 130(2) associated with the second intersection 106(2). In some instances, the first marker 130(1) and the second marker 130(2) are disposed on posts, frames, etc. for imaging via the first imaging device(s) 112. Moreover, the first marker 130(1) and/or the second marker 130(2) may be located differently than shown (e.g., prior to the first intersection 106(1) and/or the second intersection 106(2), etc.).

Figure 11:
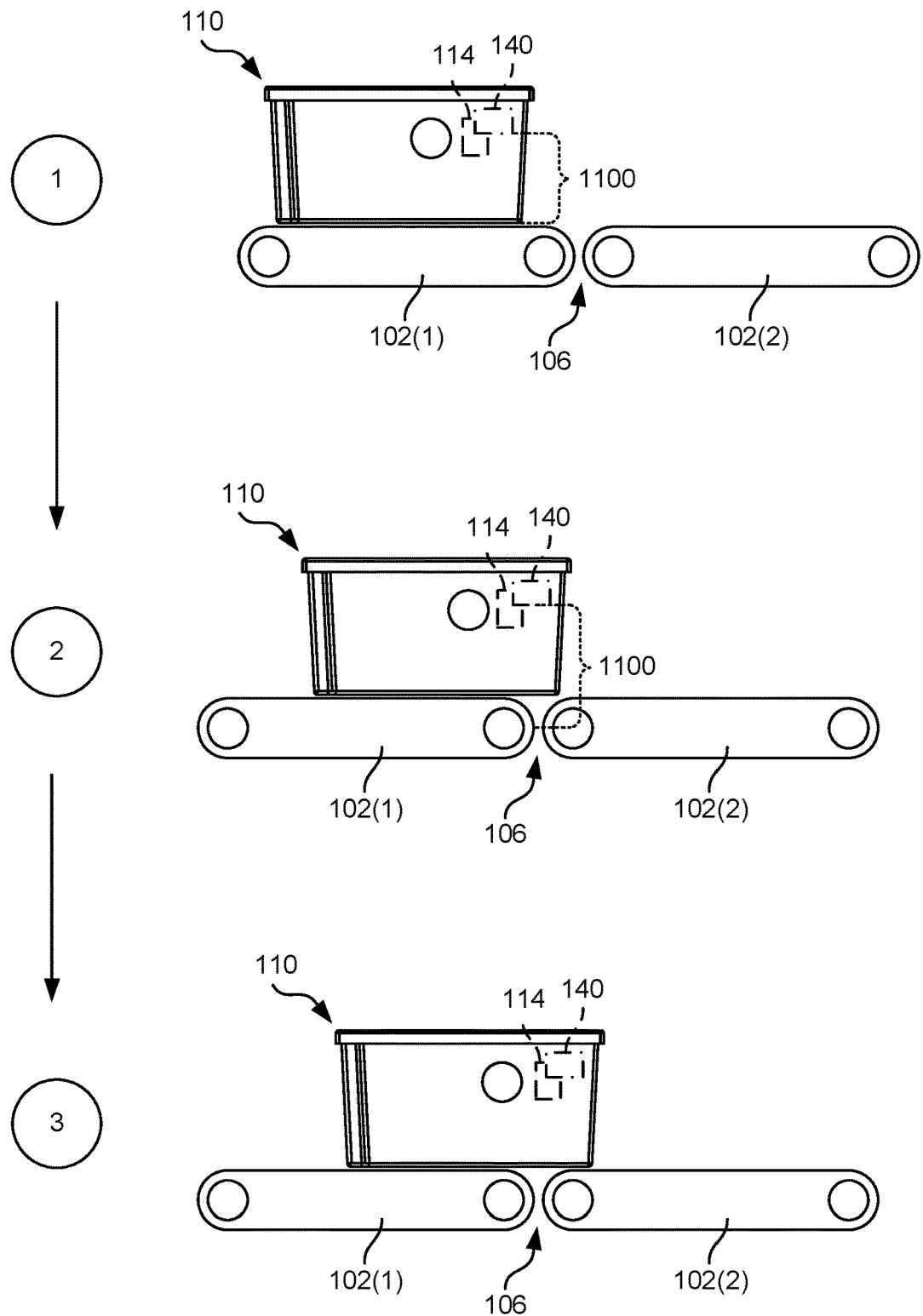
FIG. 11 illustrates an example use of the device of FIG. 1, according to an example of the present disclosure.

FIG. 11 illustrates an example of activating the second imaging device(s) 114 to generate the image data 124 based on the laser 140 detecting the intersection 106. The device 110 is shown residing on the first conveyor 102(1) and approaching the intersection 106 with the second conveyor 102(2). The device 110 moves in the direction of travel 104. At "1" the laser 140 measures a distance 1100 to the first conveyor 102(1), such as a top surface of the first conveyor 102(1), and generates the sensor data 136 indicative of the distance 1100. The distance 1100 is compared against a threshold to determine whether the distance 1100 is greater than the threshold. If so, the sensor data 136 is indicative that the device 110 is at the intersection 106. If not, the sensor data 136 is indicative that the device is not at the intersection 106. Accordingly, because at "1" the distance 1100 may be less than the threshold, the second imaging device(s) 114 may not be activated.

Comparatively, at "2" as the device 110 continues on the first conveyor 102(1), the laser 140 generates subsequent sensor data 136 indicative of the distance 1100. However, as shown, because the laser 140 is disposed at or over the intersection 106, the measured distance from the sensor data 136 may be greater than the threshold. When the distance 1100 is greater than the threshold, this may indicate that the device 110 is at the intersection 106.

At "3" the device 110 may cause the second imaging device(s) 114 to capture the image data 124 of the intersection 106. For example, based on the sensor data 136 from the laser 140 indicating that the distance 1100 is greater than the threshold, thereby indicating the intersection 106, the second imaging device(s) 114 may be instructed to power on and capture the image data 124. As such, the laser 140 may be located in front of the second imaging device(s) 114, relative to the direction of travel 104, for use in determining when the intersection 106 is present and powering on the second imaging device(s) 114. The second imaging device(s) 114, following the instruction to power on or capture the image data 124, may remain powered on for a predetermining amount of time, and may therein be powered off until instructed again to power on (upon another intersection being identified).

Figure 12:
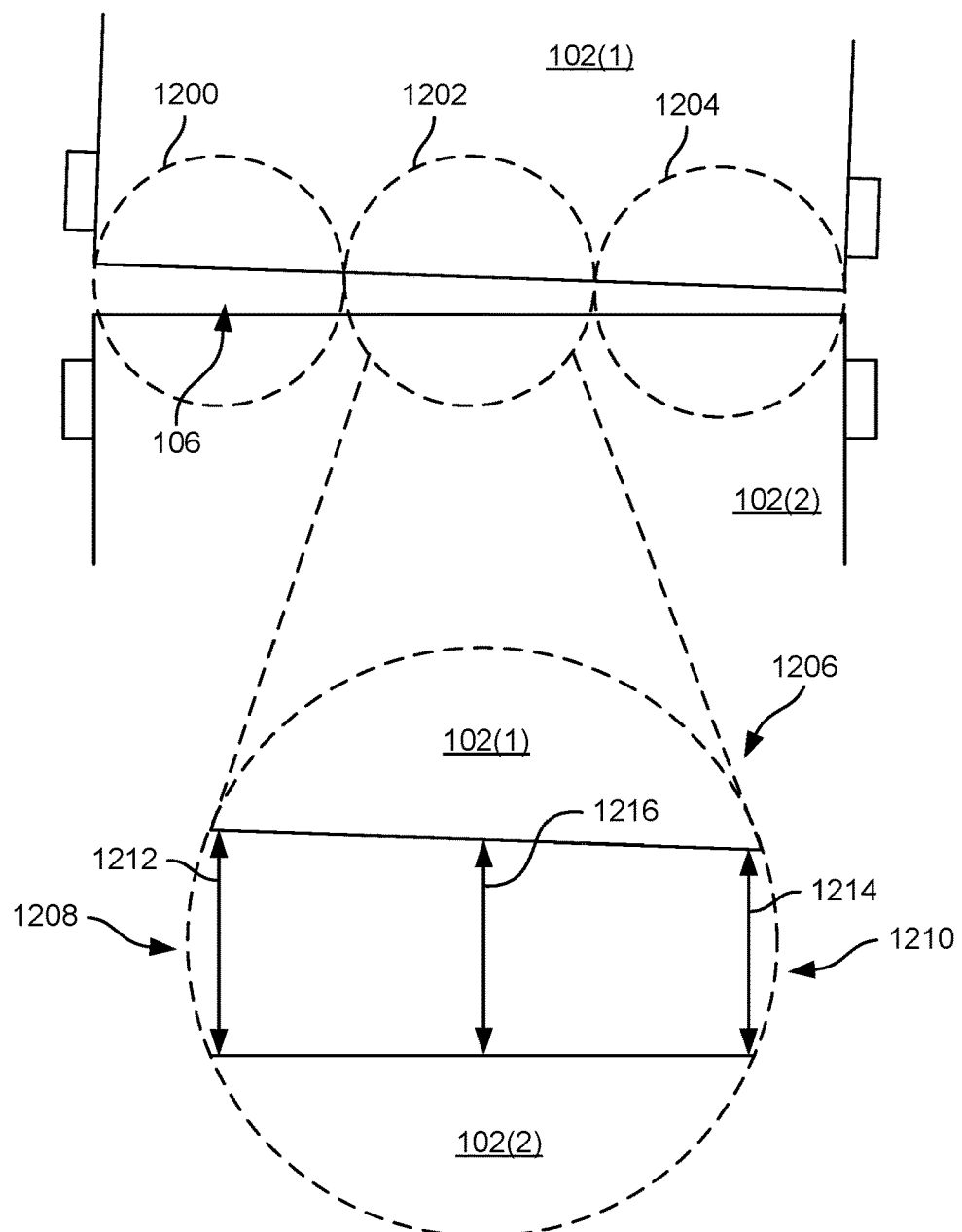
FIG. 12 illustrates an example portion of a conveyor imaged by the device of FIG. 1, according to an example of the present disclosure.

FIG. 12 illustrates an example intersection 106 between a first conveyor 102(1) and a second conveyor 102(2), according to an example of the present disclosure. Each of the second imaging device(s) 114 may be configured to image a particular portion of an intersection 106 between the first conveyor 102(1) and the second conveyor 102(2). For example, the intersection 106 may include a width (e.g., in the X-direction) that extends between sides of the first conveyor 102(1) and the second conveyor 102(2). A first of the second imaging device(s) 114 is configured to image a first portion 1200 of the width, a second of the second imaging device(s) 114 is configured to image a second portion 1202 of the width, and a third of the second imaging device(s) 114 is configured to image a third portion 1204 of the width. The second imaging device(s) 114 generate the image data 124 depicting or otherwise representing the first portion 1200, the second portion 1202, and the third portion 1204, respectively.

The image data 124 generated by the second imaging device(s) 114 is analyzed for determining whether the intersection 106 has a distance that is greater than the threshold distance. In some instances, each of the image data 124 generated by the second imaging device(s) 114 is analyzed independently, or the image data 124 generated by the second imaging device(s) 114 may be stitched together to generate an image that represents the intersection 106. To determine whether the intersection 106 includes a distance that is greater than the threshold distance, the image data 124 may be analyzed along multiple points of the intersection 106. For example, a detailed view 1206 is shown that illustrates the second portion 1202. In some instances, the second portion 1202 includes a first side 1208 and a second side 1210 spaced apart from the first side 1208 (e.g., in the X-direction). The first side 1208 may represent a first periphery of the intersection 106, within the second portion 1202, while the second side 1210 may represent a second periphery of the intersection 106 within the second portion 1202.

In some instances, a first distance 1212 of the intersection 106 may be determined at the first side of the second portion 1202, and a second distance 1214 of the second portion 1202 may be determined at the second side 1210. Additionally, a third distance 1216 of the second portion 1202 may be determined within the middle (e.g., between the first side 1208 and the second side 1210 of the second portion 1202). As such, the distance between the first conveyor 102(1) and the second conveyor 102(2) may be sampled at various points along the second portion 1202. For example, the first distance 1212, the second distance 1214, and the third distance 1216 may be used to determine whether the intersection 106 contains a pinch point.

Although the detailed view 1206 is with regard to the second portion 1202, distances between the first conveyor 102(1) and the second conveyor 102(2) may similarly be determined within the first portion 1200 and the third portion 1204. In doing so, the image data 124 of the computing device(s) 132 may be used to determine, at different locations along the intersection 106, whether there are any distances greater than the threshold distance. If so, the intersection 106 may be determined to have a pinch point. However, although three distances are described as being determined within the second portion 1202 (and/or the first portion 1200 and the third portion 1204), more than or less than three distances may be determined (e.g., two, four, six, etc.).

By imaging the entirety of the intersection 106, using the second imaging device(s) 114, pinch points may be accurately determined. For example, an inside of the intersection 106 may be spaced closer together than an outside of the intersection 106. If only the inside of the intersection 106 was imaged, the lack of a pinch point at the intersection 106 may be inaccurately determined. However, by generating the image data 124 across the length of the intersection 106, pinch points may be accurately determined.

In some instances, the first portion 1200, the second portion 1202, and/or the third portion 1204 be equal in size (e.g., image an equal width of the intersection 106). Alternatively, in some instances, the first portion 1200, the second portion 1202, and/or the third portion 1204 may be unequal in size. Additionally, in some instances, the first portion 1200, the second portion 1202, and/or the third portion 1204 may overlap or may not overlap. Additionally, in some instances, less than an entirety of the length of the intersection 106 may be imaged by the second imaging device(s) 114.

Figure 13A:
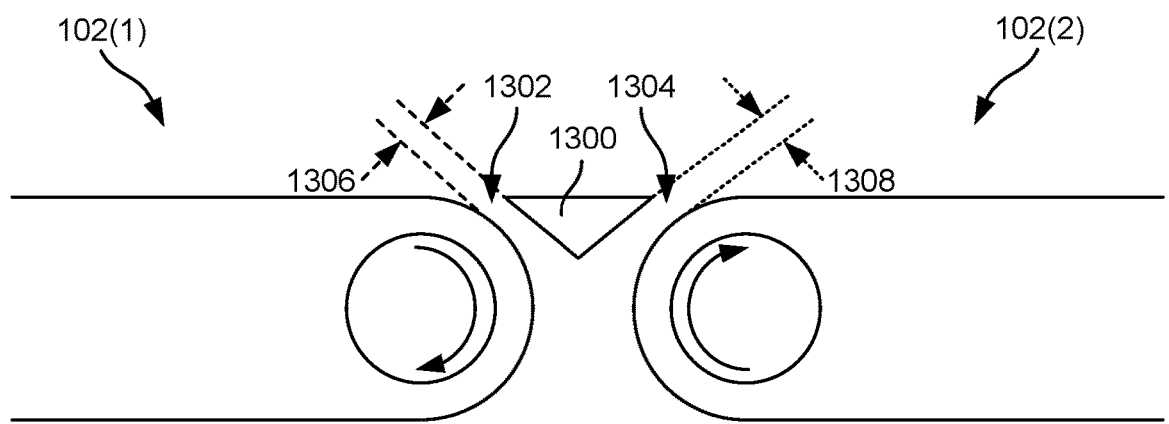
FIGS. 13A and 13B illustrate an example portion of a conveyor imaged by the device of FIG. 1, according to an example of the present disclosure.
Figure 13B:
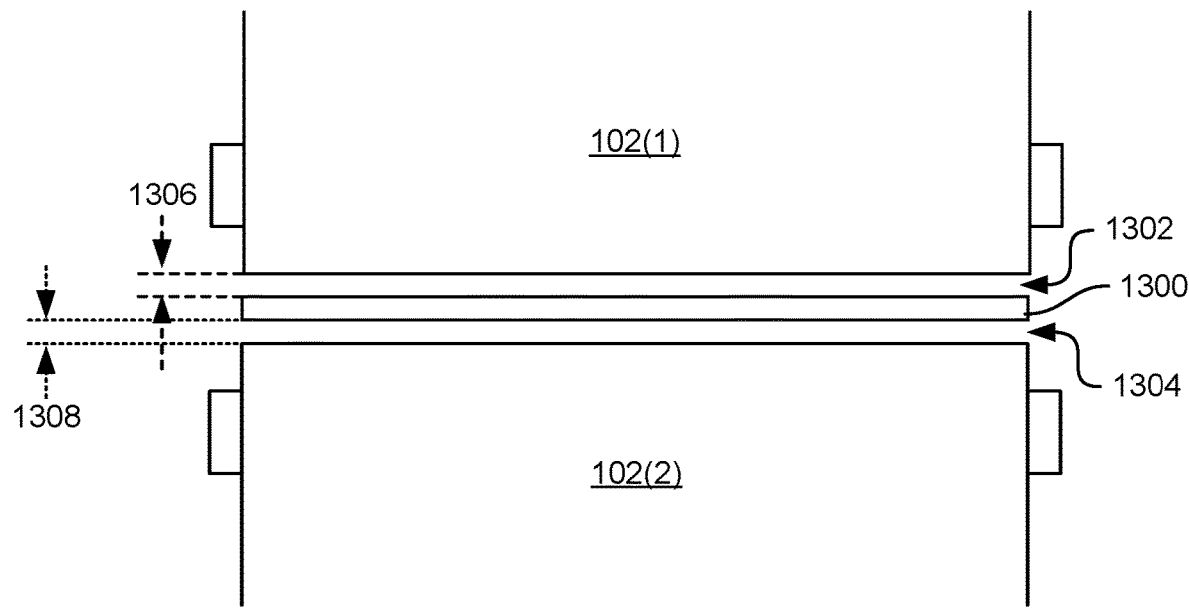

FIGS. 13A and 13B illustrate example intersections between a first conveyor 102(1) and a second conveyor 102(2), according to an example of the present disclosure. For example, FIG. 13A may illustrate a side view of the first conveyor 102(1) and the second conveyor 102(2), while FIG. 13B may illustrate a top view of the first conveyor 102(1) and the second conveyor 102(2).

In some instances, a nip guard 1300 may be disposed between the first conveyor 102(1) and the second conveyor 102(2). The nip guard 1300 may be used to reduce injuries that may happen around pulley nip points. In some instances, the nip guard 1300 may prevent access to the pulleys to prevent access to pinch points and moving machine parts. In some instances, the nip guard 1300 may be installed across the width (e.g., in the X-direction) between the first conveyor 102(1) and the second conveyor 102(2).

With the addition of the nip guard 1300, multiple intersections, or potential pinch points, may be located between the first conveyor 102(1) and the second conveyor 102(2). For example, a first intersection 1302 may be formed between the first conveyor 102(1) and a first side (e.g., surface, edge, etc.) of the nip guard 1300. A second intersection 1304 may be formed between the second conveyor 102(2) and a second side (e.g., surface, edge, etc.) of the nip guard 1300. In instances in which multiple intersections are located between the conveyors, the device 110 (e.g., the second imaging device(s) 114) may image both the first intersection 1302 and the second intersection 1304. For example, the second imaging device(s) may be used to determine a first distance 1306 (or multiple distances) associated with the first intersection 1302, and a second distance 1308 (or multiple distances) associated with the second intersection 1304.

In some instances, multiple marker(s) 130 may be disposed adjacent to the first conveyor 102(1) and the second conveyor 102(2) for distinguishing between the first intersection 1302 and the second intersection 1304. In other instances, a single marker 130 may be disposed adjacent to the first conveyor 102(1) and the second conveyor 102(2), and the image data 124 of the first intersection 1302 and the second intersection 1304 may be associated with the single marker 130.

Although the first intersection 1302 and the second intersection 1304 are shown relative to a certain surface of the first conveyor 102(1) and the nip guard 1300, and a certain surface of the second conveyor 102(2) and the nip guard 1300, the first intersection 1302 and/or the second intersection 1304 may be measured differently than shown.

Figure 14:
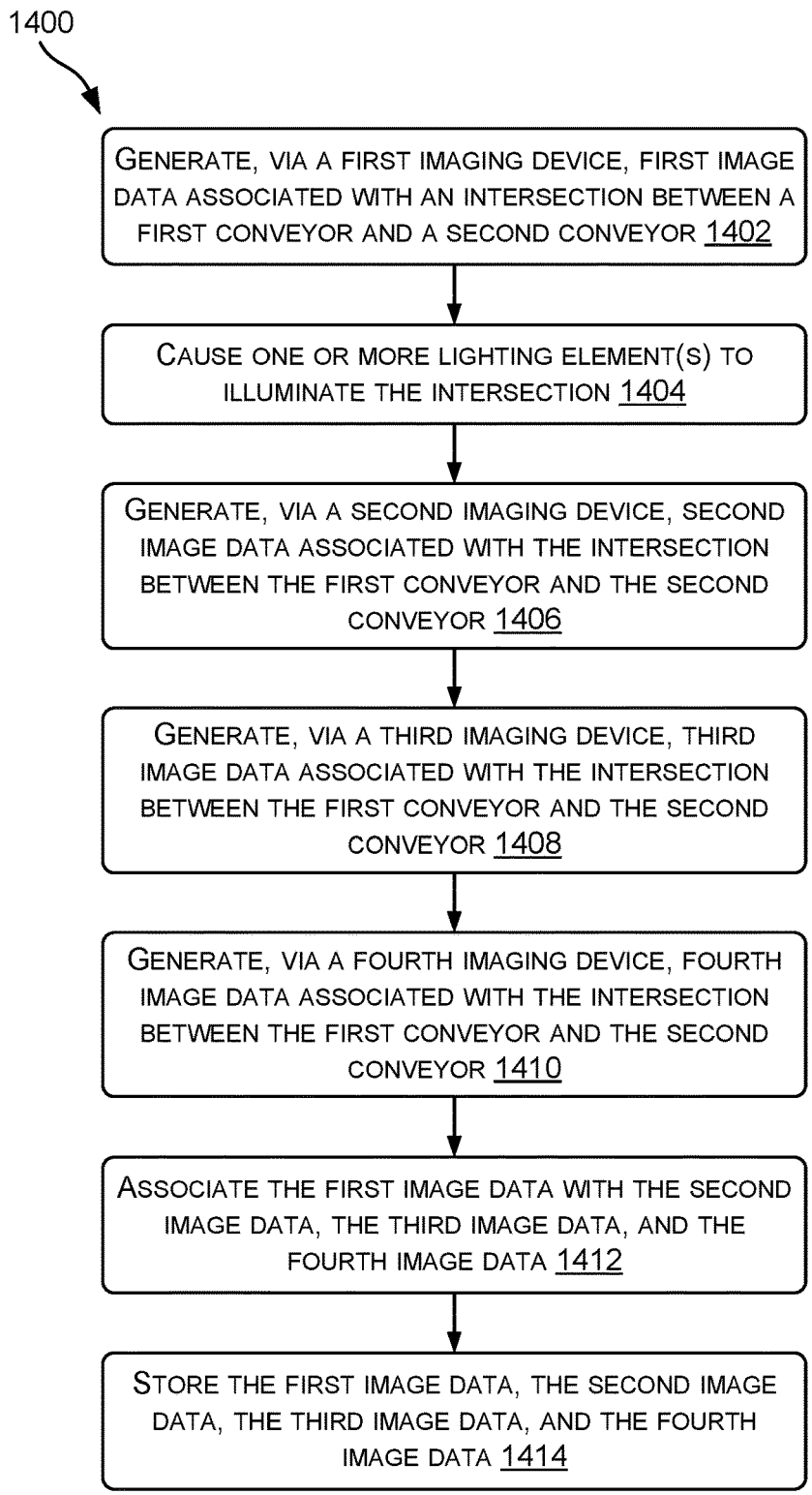
FIG. 14 illustrates an example process to image an intersection of a conveyor, according to an example of the present disclosure.
Figure 15:
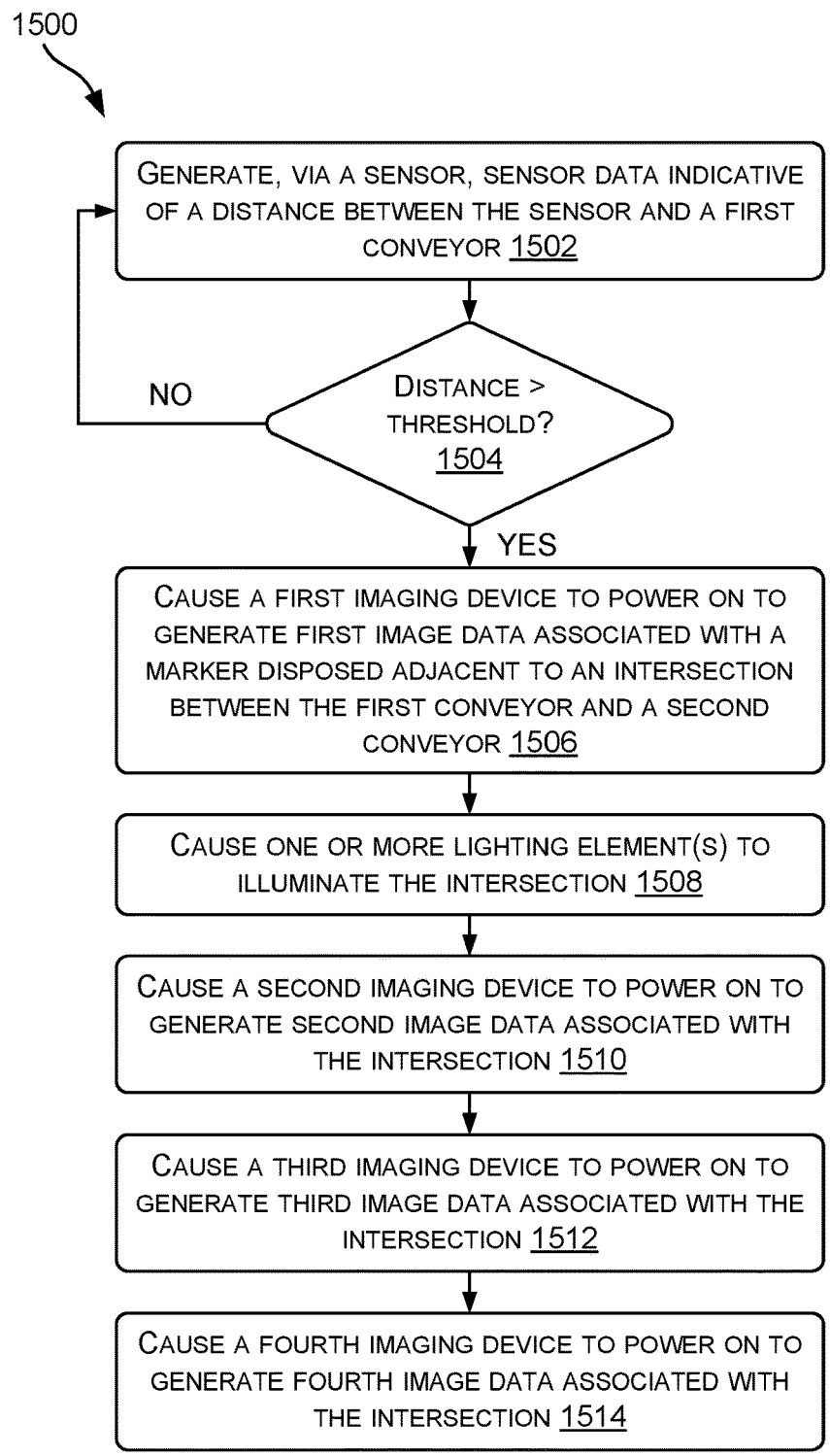
FIG. 15 illustrates an example process to image an intersection of a conveyor, according to an example of the present disclosure.
Figure 16:
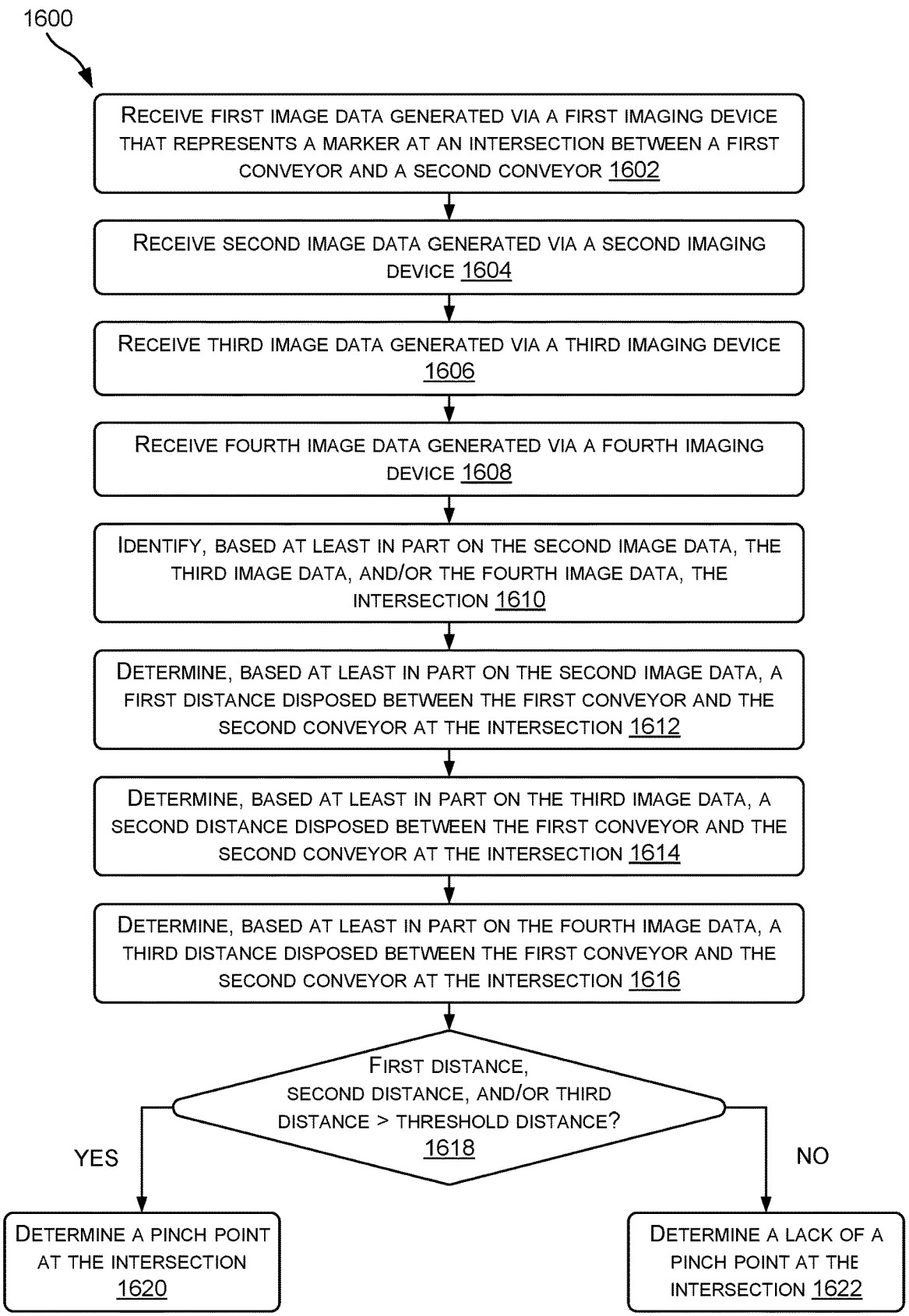
FIG. 16 illustrates an example process to image an intersection of a conveyor, according to an example of the present disclosure.

FIGS. 14-16 illustrate various processes related to determining pinch points within an environment. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, devices, and systems described in the examples herein, such as, for example those described with respect to FIGS. 1-13B, although the processes may be implemented in a wide variety of other environments, architectures, devices, and systems.

FIG. 14 illustrates an example process 1400 associated with generating image data as the device 110 traverses about an environment. For example, to image the environment, the device 110 may be placed on a system of conveyors (e.g., belts, rollers, etc.), and may be propelled throughout the environment, along the system of conveyors (e.g., via an operation of the conveyors).

At 1402, the process 1400 may include generating, via a first imaging device, first image data associated with an intersection between a first conveyor and a second conveyor. For example, adjacent to the intersection, markers may be placed. The markers may be used to identify the intersection between the first conveyor and the second conveyor, for example. Throughout the environment, the markers may be disposed adjacent to each or some of the intersections between conveyor(s), transfer points, or potential pinch points. In some instances, the marker may represent a QR code that is imaged by the first imaging device. As will be explained herein, the first image data may be used to identify the intersection (e.g., among the plurality of other intersections) such that the image data captured by the second imaging device(s) is associated with the image data generated by the first imaging device.

At 1404, the process 1400 may include causing one or more lighting element(s) to illuminate the intersection. For example, the lighting element(s) may illuminate the intersection for imaging by the second imaging device(s). In some instances, the lighting element(s) may illuminate when the device is initially placed upon the conveyors, or the lighting element(s) may illuminate upon approaching the intersection. For example, upon the first imaging device imaging the marker, the lighting element(s) may be caused to illuminate. That is, upon analyzing the first image data, for example, the device may determine that an intersection is approaching, and subsequently, cause the lighting element(s) to illuminate. However, in some instances, the lighting element(s) may continuously be illuminated as the device moves about the environment. The lighting element(s) may be oriented to output light through openings in the container to illuminate the intersection. Any number of lighting element(s) may be used, and an luminosity of the lighting element(s) may be adjustable. In some instances, the lighting element(s) are disposed across a width of the container (or the conveyor) such that an entirety of the intersection is illuminated. In doing so, different areas of the intersection that are imaged by the second imaging device(s) may be illuminated.

At 1406, the process 1400 may include generating, via a second imaging device, second image data associated with the intersection between the first conveyor and the second conveyor. For example, the second imaging device may represent one of the second imaging device(s) that is oriented towards the conveyors and configured to image the intersection. In some instances, the second imaging device is configured to image a first portion (e.g., section, width, segment, etc.) of the intersection. In some instances, the second imaging device may be instructed to generate the second image data in response to the intersection being identified. For example, the second imaging device (or another of the second imaging device(s)) may identify a gap or void in the conveyor, and associate the gap or void with the intersection. Additionally, or alternatively, the second imaging device may be configured to generate the second image data in response to the first imaging device identifying the intersection.

At 1408, the process 1400 may include generating, via a third imaging device, third image data associated with the intersection between the first conveyor and the second conveyor. For example, the third imaging device may represent one of the second imaging device(s) that is oriented towards the conveyors and configured to image the intersection. In some instances, the third imaging device is configured to image a second portion (e.g., section, width, segment, etc.) of the intersection. In some instances, the second portion of the intersection is adjacent to the first portion as imaged by the second imaging device. In some instances, the third imaging device may be instructed to generate the third image data in response to the intersection being identified. For example, the third imaging device (or another of the second imaging device(s)) may identify the gap or void in the conveyor, and associate the gap or void with the intersection. Additionally, or alternatively, the third imaging device may be configured to generate the third image data in response to the first imaging device identifying the intersection.

At 1410, the process 1400 may include generating, via a fourth imaging device, fourth image data associated with the intersection between the first conveyor and the second conveyor. For example, the fourth imaging device may represent one of the second imaging device(s) that is oriented towards the conveyors and configured to image the intersection. In some instances, the fourth imaging device is configured to image a third portion (e.g., section, width, segment, etc.) of the intersection. In some instances, the third portion of the intersection is adjacent to the first portion and/or the second portion as imaged by the second imaging device and the third imaging device, respectively. In some instances, the fourth imaging device may be instructed to generate the fourth image data in response to the intersection being identified. For example, the fourth imaging device (or another of the second imaging device(s)) may identify the gap or void in the conveyor, and associate the gap or void with the intersection. Additionally, or alternatively, the fourth imaging device may be configured to generate the third image data in response to the first imaging device identifying the intersection.

At 1412, the process 1400 may include associating the first image data, the second image data, the third image data, and/or the fourth image data. For example, using time stamps associated with when the first image data, the second image data, the third image data, and/or the fourth image data was generated, the first image data, the second image data, the third image data, and/or the fourth image data may be associated with one another. Associating the first image data, the second image data, the third image data, and/or the fourth image data allows for the intersection, as identified within the second image data, the third image data, and/or the fourth image data to be identifiable amongst other intersections in the environment. For example, if the intersection as determined by the first imaging device (or the first image data) corresponds to "Intersection 125" within the environment, then the second image data, the third image data, and/or the fourth image data may be associated with "Intersection 125." In doing so, the second image data, the third image data, and/or the fourth image data may be analyzed to determine whether "Intersection 125" contains any pinch points. As used, "Intersection 125" may be a certain intersection within the environment (e.g., Intersection 125 among 600 in environment). However, other identifiers may be used (e.g., location A, conveyors A and B, etc.).

At 1414, the process 1400 may include storing the first image data, the second image data, the third image data, and/or the fourth image data. For example, as the device traverses about the environment, the device may store the first image data, the second image data, the third image data, and/or the fourth image data in the memory. In some instances, and as noted above, the first image data, the second image data, the third image data, and/or the fourth image data may be stored in association with one another. For example, for each intersection, the device may store image data associated with the intersection (e.g., as generated by the second imaging device(s)). Upon the device completing a cycle within the environment, the device may upload the data as stored. Alternatively, the memory of the device may be accessed, removed (e.g., external storage), etc. for analyzing the first image data, the second image data, the third image data, and/or the fourth image data.

Although the discussion herein relates to capturing data associated with a single intersection, as noted, the device may capture image data associated with a plurality of intersections. In doing so, the device may store the image data as captured by the second imaging device(s) with the image data captured by the first imaging device for identifying the intersections. Additionally, the device may also generate sensor data via one or more sensors as the device traverses about the environment. The sensor data, for example, may indicate areas of vibration, areas of friction (e.g., increased heat), areas of decreased or increased speed, and so forth.

FIG. 15 illustrates an example process for determining when to activate components of the device for capturing image data of the intersection. At 1502, the process 1500 may include generating, via a sensor, sensor data indicative of a distance between the sensor and a first conveyor. The sensor data may be generated via the laser within the device, for use in determining the distance disposed between the laser and the first conveyor (e.g., a top surface thereof). As will be explained herein, the distance may be used to determine whether the device resides at or above the intersection.

At 1504, the process 1500 may determine whether the distance is greater than a threshold distance. For example, the distance may be compared against the threshold to determine whether the distance is greater than the threshold. If the distance is greater than the threshold, the sensor data is indicative that the device is at the intersection (i.e., the laser sensed the intersection). If the distance is less than the threshold, the sensor data is not indicative that the device is not at the intersection. In other words, if the laser is disposed over the intersection 106, the measured distance from the sensor data may be greater than the threshold. When the distance is greater than the threshold, this may indicate that the device is at or residing over the intersection. If at 1504 the process 1500 determines that the distance is less than the threshold, the process 1500 may follow the "NO" route and loop to 1502, whereby the laser may continue to generate the sensor data for determining whether the distance is greater than the threshold. Comparatively, if the distance is greater than the threshold, the process 1500 may follow the "YES" route and proceed to 1506.

At 1506, the process 1500 may include causing the first imaging device to power on to generate first image data associated with a marker disposed adjacent to an intersection between the first conveyor and a second conveyor. For example, based on the sensor data indicating that the distance is greater than the threshold, thereby indicating the intersection, the first imaging device(s) may be instructed to power on and capture the image data of the marker.

At 1508, the process 1500 may include causing one or more lighting element(s) to illuminate the intersection. For example, based on the sensor data indicating that the distance is greater than the threshold, the one or more lighting element(s) may illuminate the intersection for imaging by the second imaging device(s).

At 1510, the process 1500 may include causing a second imaging device to power on to generate second image data associated with the intersection. For example, the second imaging device may represent one of the second imaging device(s) that is oriented towards the conveyors and configured to image the intersection. In some instances, the second imaging device is configured to image a first portion (e.g., section, width, segment, etc.) of the intersection. As such, because the sensor detected the intersection, the second imaging device may be powered on to generate the image data.

At 1512, the process 1500 may include causing a third imaging device to power on to generate third image data associated with the intersection. For example, the third imaging device may represent one of the second imaging device(s) that is oriented towards the conveyors and configured to image the intersection. In some instances, the third imaging device is configured to image a second portion (e.g., section, width, segment, etc.) of the intersection. As such, because the sensor detected the intersection, the third imaging device may be powered on to generate the image data.

At 1514, the process 1500 may include causing a fourth imaging device to power on to generate fourth image data associated with the intersection. For example, the fourth imaging device may represent one of the fourth imaging device(s) that is oriented towards the conveyors and configured to image the intersection. In some instances, the second imaging device is configured to image a third portion (e.g., section, width, segment, etc.) of the intersection. As such, because the sensor detected the intersection, the fourth imaging device may be powered on to generate the image data.

In some instances, the first imaging device, the second imaging device, the third imaging device, and the fourth imaging device may be powered on for a predetermined amount of time to capture the image data of the intersection, and thereafter, may be powered off until the sensor detects another intersection.

FIG. 16 illustrates an example process 1600 for determining whether an environment contains a pinch point. At 1602, the process 1600 may include receiving first image data generated by a first imaging device that represents a marker at an intersection between a first conveyor and a second conveyor. For example, in some instances, the first image data may be received (e.g., downloaded, transferred, etc.) once the device traverses about an environment along the conveyors. That is, after the device has traversed the environment, the first image data may be received. The first image data is generated via the first imaging device that is oriented to image the marker(s) disposed at the intersection.

At 1604, the process 1600 may include receiving second image data generated via a second imaging device. For example, in some instances, the second image data may be received (e.g., downloaded, transferred, etc.) once the device traverses about an environment along conveyors. In some instances, the second image data represents a first portion (e.g., section, width, segment, etc.) of the intersection between the first conveyor and the second conveyor. The second imaging device may represent one of the second imaging device(s) that is configured to image the conveyors or the intersections.

At 1606, the process 1600 may include receiving third image data generated via a third imaging device. For example, in some instances, the third image data may be received (e.g., downloaded, transferred, etc.) once the device traverses about an environment along conveyors. In some instances, the third image data represents a second portion (e.g., section, width, segment, etc.) of the intersection between the first conveyor and the second conveyor. In some instances, the second portion of the intersection is adjacent to the first portion. The third imaging device may represent one of the second imaging device(s) that is configured to image the conveyors or the intersections.

At 1608, the process 1600 may include receiving fourth image data generated via a fourth imaging device. For example, in some instances, the fourth image data may be received (e.g., downloaded, transferred, etc.) once the device traverses about an environment along conveyors. In some instances, the fourth image data represents a third portion (e.g., section, width, segment, etc.) of the intersection between the first conveyor and the second conveyor. In some instances, the third portion of the intersection is adjacent to the second portion. The fourth imaging device may represent one of the second imaging device(s) that is configured to image the conveyors or the intersections.

At 1610, the process 1600 may include identifying, based at least in part on the second image data, the third image data, and/or the fourth image data, the intersection. For example, by analyzing the second image data, the third image data, or the fourth image data, the intersection may be identified. In some instances, the intersection may be identified based on determining a gap or void in the conveyor. For example, the conveyor may include a continuous surface, and a gap or void in the continuous surface may represent an intersection between two conveyors, for example. Additionally, or alternatively, in some instances, the intersection may be determined via time stamps associated with a time at which the first imaging device imaged the marker(s). For example, in response to the first imaging device imaging the marker associated with the intersection, the second image data, the third image data, and/or the fourth image data may be used to identify the intersection. In other words, via imaging the marker, the intersection within the second image data, the third image data, and/or the fourth image data may be identified.

At 1612, the process 1600 may include determining, based at least in part on the second image data, a first distance disposed between the first conveyor and the second conveyor. For example, upon determining the intersection, the second image data may be analyzed to determine a distance interposed between the first conveyor and the second conveyor. In some instances, given that the second image data may represent a portion of the length of the intersection, the distance may represent a greatest distance interposed between the first conveyor and the second conveyor. That is, as the second image data represent a portion of the length of the intersection, along that portion of the length, the intersection may have different distances. To determine the pinch points, at 1612, the process 1600 may determine a maximum distance over the portion of the length.

At 1614, the process 1600 may include determining, based at least in part on the third image data, a second distance disposed between the first conveyor and the second conveyor. For example, upon determining the intersection, the third image data may be analyzed to determine a distance interposed between the first conveyor and the second conveyor. In some instances, given that the third image data may represent a portion of the length of the intersection, the distance may represent a greatest distance interposed between the first conveyor and the second conveyor. That is, as the third image data represent a portion of the length of the intersection, along that portion of the length, the intersection may have different distances. To determine the pinch points, at 1614, the process 1600 may determine a maximum distance over the portion of the length.

At 1616, the process 1600 may include determining, based at least in part on the fourth image data, a third distance disposed between the first conveyor and the second conveyor. For example, upon determining the intersection, the fourth image data may be analyzed to determine a distance interposed between the first conveyor and the second conveyor. In some instances, given that the fourth image data may represent a portion of the length of the intersection, the distance may represent a greatest distance interposed between the first conveyor and the second conveyor. That is, as the fourth image data represent a portion of the length of the intersection, along that portion of the length, the intersection may have different distances. To determine the pinch points, at 1616, the process 1600 may determine a maximum distance over the portion of the length.

At 1618, the process 1600 may include determining whether the first distance, the second distance, and/or the third distance are greater than a threshold distance. For example, using the first distance, the second distance, and the third distance, as determined at 1612, 1614, and 1616, respectively, the process 1600 may determine whether those distances are greater than the threshold distance. In some instances, the threshold distance may be predetermined to identify pinch points (e.g., drowing-in). For example, the threshold distance may be 5 mm. That is, in some instances, if the first distance, the second distance, and/or the third distance are greater than 5 mm, the process 1600 may determine that the intersection is a pinch point, or that the environment contains a pinch point between the first conveyor and the second conveyor. In some instances, the process 1600 may determine if any or all of the first distance, the second distance, and/or the third distance are greater that the threshold distance. Additionally, the threshold distance may be dependent upon the size of the conveyors, the speed of the conveyors, the type of the conveyors, and so forth. As such, the threshold distance may be adjusted depending upon specifics of the environment and/or the conveyor(s).

If At 1618 the process 1600 determines that the first distance, the second distance, and/or the third distance are greater than the threshold distance, the process 1600 may follow the "YES" route and proceed to 1620. Here, at 1620, the process 1600 may include determining that a pinch point exists at the intersection. In some instances, upon determining the pinch point, personnel may be dispatched to the intersection within the environment. For example, the personnel may adjust the first conveyor and/or the second conveyor such that the intersection includes distances that are less than the threshold distance. Comparatively, if at 1618 the process 1600 determines that the first distance, the second distance, and/or the third distance are not greater than the threshold distance (e.g., are less than the threshold distance), the process 1600 may follow the "NO" route and proceed to 1622. Here, at 1622, the process 1600 may determine a lack of a pinch point at the intersection. Accordingly, if a pinch point does not exist, the intersection may be acceptable and no pinch point may be determined.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A device configured to traverse along a first conveyor and be transferred to a second conveyor, the device comprising:
    a container including:
        a first opening disposed on a side of the container,
        a second opening disposed on a bottom of the container, and
        a third opening disposed on the bottom of the container;
    a first imaging device that is disposed within the container and that is oriented towards the first opening;
    a second imaging device that is disposed within the container and that is oriented towards the second opening;
    a third imaging device that is disposed within the container and that is oriented towards the second opening;
    a fourth imaging device that is disposed within the container and that is oriented towards the second opening;
    a sensor that is disposed within the container and that is oriented towards the third opening;
    one or more processors; and
    one or more non-transitory computer-readable media storing computer-executable instructions that, when executed by the one or more processors, cause the one or more processors to perform operations comprising:
        causing the first imaging device to generate first image data depicting a marker disposed at an intersection between the first conveyor and the second conveyor,
        receiving, from the sensor, sensor data indicative of a distance between the sensor and a surface of the first conveyor;
        determining that the distance is greater than a threshold distance; and
        based on the distance being greater than the threshold distance, causing:
            the second imaging device to generate second image data depicting the intersection between the first conveyor and the second conveyor,
            the third imaging device to generate third image data depicting the intersection between the first conveyor and the second conveyor, and
            the fourth imaging device to generate fourth image data depicting the intersection between the first conveyor and the second conveyor.

2. The device of claim 1, further comprising a lighting element that is disposed within the container and that is oriented towards the second opening, the operations further comprising causing the lighting element to emit light towards the second opening.

3. The device of claim 1, further comprising:
    a frame disposed within the container; and
    a battery coupled to the frame,
    wherein:
        the first imaging device couples to the frame for orienting the first imaging device towards the first opening, and the second imaging device, the third imaging device, and the fourth imaging device couple to the frame for orienting the second imaging device, the third imaging device, and the fourth imaging device towards the second opening.

4. The device of claim 1, the operations further comprising sending the first image data, the second image data, the third image data, and the fourth image data to a computing device, wherein the computing device is configured to:
analyze the second image data, the third image data, and the fourth image data to determine that the intersection contains a second distance interposed between the first conveyor and the second conveyor that is equal to or greater than a second threshold distance; and
based on the intersection containing the second distance that is equal to or greater than the second threshold distance, identifying the intersection based on the first image data.

5. A device, comprising:
a battery;
a container;
a frame;
a first imaging device disposed at least partially within the container and coupled to the frame, the first imaging device being oriented in a first direction and configured to generate first image data associated with an identifier of an intersection between a conveyor and a transfer location;
a second imaging device disposed at least partially within the container and coupled to the frame, the second imaging device being oriented in a second direction that is different than the first direction and configured to generate second image data associated with the intersection between the conveyor and the transfer location; and
a third imaging device disposed at least partially within the container and coupled to the frame, the third imaging device being oriented in the second direction and configured to generate third image data associated with the intersection between the conveyor and the transfer location.

6. The device of claim 5, wherein:
the container includes a first opening aligned with the first direction; and
the container includes a second opening aligned with the second direction.

7. The device of claim 6, wherein:
the first opening is located on a side of the container; and
the second opening is located on a bottom of the container, the bottom being configured to reside on the conveyor and the transfer location.

8. The device of claim 5, wherein at least one of second image data or the third image data is used to determine whether the intersection includes a distance that is equal to or greater than a threshold distance, the distance being defined between the conveyor and the transfer location.

9. The device of claim 5, further comprising:
a sensor;
one or more processors; and
one or more non-transitory computer-readable media storing computer-executable instructions that, when executed by the one or more processors, cause the one or more processors to perform operations comprising:
receiving, from the sensor, sensor data associated with a distance between the sensor and a surface of the conveyor,
determining that the distance is greater than a threshold distance, and
based at least in part on the distance being greater than the threshold distance:
causing the second imaging device to generate the second image data associated with the intersection, and
causing the third imaging device to generate the third image data associated with the intersection.

10. The device of claim 5, further comprising:
a sensor;
one or more processors; and
one or more non-transitory computer-readable media storing computer-executable instructions that, when executed by the one or more processors, cause the one or more processors to perform operations comprising:
receiving, from the sensor, sensor data associated with a distance between the sensor and a surface of the conveyor,
determining that the distance is less than a threshold distance, and
based at least in part on the distance being less than the threshold distance:
refraining from causing the second imaging device to generate the second image data associated with the intersection, and
refraining from causing the third imaging device to generate the third image data associated with the intersection.

11. The device of claim 5, further comprising one or more lighting elements configured to output light at least partially in the second direction.

12. The device of claim 11, further comprising a laser, wherein:
the container includes a front and a back opposite the front;
the one or more lighting elements are located more proximate to the front than the second imaging device and the third imaging device;
the first imaging device is located more proximate to the back than the second imaging device and the third imaging device; and
the laser is located more proximate to the front than the second imaging device and the third imaging device.

13. The device of claim 5, further comprising a fourth imaging device disposed at least partially within the container and coupled to the frame, the fourth imaging device being oriented in the second direction.

14. The device of claim 5, wherein the second direction is substantially orthogonal to the first direction.

15. A device, comprising:
a container including:
a first opening, and
a second opening;
a first imaging device disposed at least partially within the container, the first imaging device being oriented towards the first opening;
a second imaging device disposed at least partially within the container, the second imaging device being oriented towards the second opening;
one or more lighting elements disposed within the container, the one or more lighting elements being oriented towards the second opening;

one or more processors; and
one or more non-transitory computer-readable media storing computer-executable instructions that, when executed by the one or more processors, cause the one or more processors to perform operations comprising:
causing the first imaging device to generate first image data associated with a marker disposed at an intersection of a conveyor, and
causing the second imaging device to generate second image data depicting the intersection of the conveyor.

16. The device of claim 15, further comprising at least one of:
a third imaging device that is disposed at least partially within the container and that is oriented towards at least one of the second opening or a third opening in the container; or
a fourth imaging device that is disposed at least partially within the container and that is oriented towards at least one of the second opening, third opening, or a fourth opening in the container.

17. The device of claim 16, wherein:
the third imaging device is configured to generate third image data depicting the intersection of the conveyor; and
the fourth imaging device is configured to generate fourth image data depicting the intersection of the conveyor.

18. The device of claim 15, further comprising one or more network interfaces, the operations further comprising:
associating the first image data and the second image data; and
sending, via the one or more network interfaces, the first image data and the second image data to one or more computing devices.

19. The device of claim 15, wherein the container further includes a third opening, further comprising a laser oriented towards the third opening, the operations further comprising:
receiving, from the laser, data indicative of a distance between the laser and a surface of the conveyor;
determining that the distance is greater than a threshold distance; and
based on the distance being greater than the threshold distance, causing the first imaging device to generate the first image data and the second imaging device to generate second image data.

20. The device of claim 19, wherein:
the container includes a bottom and a side, the bottom being configured to reside on the conveyor;
the first opening is formed on the side;
the second opening is formed on the bottom; and
the third opening is formed on the bottom.

* * * * *